US012728632B2

(12) United States Patent
Yokoi et al.

(10) Patent No.: US 12,728,632 B2
(45) Date of Patent: Sep. 8, 2026

(54) PRINTING SYSTEM

(71) Applicant: FUJI CORPORATION, Chiryu (JP)

(72) Inventors: Yoshimune Yokoi, Kiyosu (JP); Naoki Matsuzaki, Nishio (JP); Shoji Fukakusa, Yokkaichi (JP)

(73) Assignee: FUJI CORPORATION, Chiryu (JP)

( * ) Notice: Subject to any disclaimer, the term of this patent is extended or adjusted under 35 U.S.C. 154(b) by 26 days.

(21) Appl. No.: 18/862,332

(22) PCT Filed: May 16, 2022

(86) PCT No.: PCT/JP2022/020414
§ 371 (c)(1),
(2) Date: Nov. 1, 2024

(87) PCT Pub. No.: WO2023/223392
PCT Pub. Date: Nov. 23, 2023

(65) Prior Publication Data
US 2025/0282136 A1 Sep. 11, 2025

(51) Int. Cl.
*B41F 15/36* (2006.01)
*B41F 15/08* (2006.01)
*B41F 33/00* (2006.01)
*B41F 33/14* (2006.01)

(52) U.S. Cl.
CPC .......... *B41F 15/36* (2013.01); *B41F 15/0813* (2013.01); *B41F 33/00* (2013.01); *B41F 33/14* (2013.01)

(58) Field of Classification Search
None
See application file for complete search history.

(56) References Cited

U.S. PATENT DOCUMENTS

2021/0197545 A1 7/2021 Yokoi

FOREIGN PATENT DOCUMENTS

JP 8-39786 A 2/1996
WO WO 2019/225002 A1 11/2019

OTHER PUBLICATIONS

International Search Report issued on Jul. 26, 2022 in PCT/JP2022/020414, filed May 16, 2022, citing references 1 & 15-16 therein, 2 pages.

*Primary Examiner* — Joshua D Zimmerman
(74) *Attorney, Agent, or Firm* — Oblon, McClelland, Maier & Neustadt, L.L.P.

(57) ABSTRACT

A printing system includes a printing device, an accommodation rack in which multiple shelf sections accommodate a support frame supporting an exchanging member are provided and the support frame is movable between the printing device and the shelf sections, and which has an opening in a side surface parallel to a movement direction of the support frame, a delivery device including a feeding section capable of feeding in or out the support frame in the movement direction in a state of abutting on the support frame in the accommodation rack, and a moving section causing the feeding section to enter and exit from the accommodation rack through the opening, and an exchange control section including a position sensor configured to detect an entering state of the feeding section and detect that there is no support frame in the shelf sections.

2 Claims, 23 Drawing Sheets

PRINTING SYSTEM

TECHNICAL FIELD

The present description discloses a printing system.

BACKGROUND ART

Conventionally, an exchangeable printing system is known in which an exchanging member (screen mask or the like) is placed on a support frame between an accommodation device having multiple accommodation sections for accommodating a support frame and a printing device (refer to Patent Literature 1).

Patent Literature

Patent Literature 1: WO 2019/225002

BRIEF SUMMARY

Technical Problem

In such a printing system, it is desirable to feed out the support frame to the printing device after confirming that there is the support frame in the accommodation section, or to feed in the support frame from the printing device after confirming that there is an empty space in the accommodation section. However, in the printing system described in Patent Literature 1, it is not discussed to detect the presence or absence of the support frame in the accommodation section. Therefore, there is a concern that the support frame may be fed out to the printing device in a state where there is no support frame in the accommodation section, or the support frame may be fed in from the printing device in a state where there is no empty space in the accommodation section.

A main object of the present disclosure is to more reliably feed out or in a support frame between an accommodation rack and a printing device.

Solution to Problem

A first printing system of the present disclosure includes:

a printing device;

an accommodation rack in which multiple shelf sections capable of accommodating a support frame supporting an exchanging member are provided and the support frame is movable between the printing device and the shelf sections in a state where the accommodation rack faces the printing device, and which has an opening in a side surface parallel to a movement direction of the support frame;

a delivery device including a feeding section capable of feeding in or out the support frame in the movement direction in a state of abutting on the support frame in the accommodation rack, and a moving section causing the feeding section to enter and exit from the accommodation rack through the opening; and a first detection section including a first sensor configured to detect an entering state of the feeding section with respect to the accommodation rack, and capable of detecting that there is no support frame in the shelf sections based on a detection signal of the first sensor.

In the first printing system, it is possible to detect that there is no support frame in the shelf section based on the detection signal of the first sensor. Therefore, it is possible to prevent the support frame from being fed out to the printing device in a state where there is no support frame in the shelf section, or to prevent the support frame from being fed in from the printing device in a state where the support frame is present in the shelf section. As a result, the support frame can be more reliably fed out or in between the accommodation rack and the printing device.

A second printing system of the present disclosure includes:

a printing device;

an accommodation rack in which multiple shelf sections capable of accommodating a support frame supporting an exchanging member are provided and the support frame is movable between the printing device and the shelf sections in a state where the accommodation rack faces the printing device; and a lifting and lowering device including a pair of rack support members capable of supporting a lower surface of the accommodation rack from both sides in an orthogonal direction orthogonal to a movement direction of the support frame and an up-down direction in the state where the accommodation rack faces the printing device, and configured to lift and lower the rack support members, in which the support frame includes multiple holding sections arranged in the movement direction, the holding sections being capable of holding exchanging members of different sizes, and the accommodation rack includes a weight provided such that a center of gravity of the accommodation rack is positioned closer to the printing device than a position supported by the rack support members in the state where the accommodation rack faces the printing device.

In the second printing system, the weight is provided in the accommodation rack such that the center of gravity of the accommodation rack is positioned closer to the printing device than the position where the accommodation rack is supported by the rack support member. Accordingly, when the accommodation rack is lifted and lowered together with the rack support member, the accommodation rack is less likely to be inclined to the side opposite to the printing device. It is particularly effective in the case where an exchanging member larger in size than the exchanging member held by the holding section on the downstream side in the movement direction of the support frame is held in the holding section on the upstream side in the movement direction of the support frame. This is because the center of gravity of the accommodation rack is likely to be biased to the side opposite to the printing device with respect to the rack support member as compared with a case where the exchanging member having the same size is held in the holding sections on the downstream side and the upstream side or a case where the exchanging member is held only in the holding section on the downstream side in the movement direction.

A third printing system of the present disclosure includes:

a printing device;

an accommodation rack in which multiple shelf sections capable of accommodating a support frame supporting an exchanging member are provided and the support frame is movable between the printing device and the shelf sections in a state where the accommodation rack faces the printing device, and which has an opening in a side surface parallel to a movement direction of the support frame; and a delivery device including a feeding section including one or more driving rolls made of urethane, and capable of feeding in or out the support frame in the movement direction by the driving rolls being driven in a state where the driving rolls abut on the support frame in the accommodation rack, and a moving section causing the feeding section to enter and exit from the accommodation rack through the opening.

In the third printing system, the driving roll made of urethane is driven in a state of abutting on the support frame in the accommodation rack, and thus, the support frame is fed out or in. As compared with the case where the support frame is fed out or in by a friction force of a rubber belt, abrasion powder is less likely to enter the printing device. This is because the urethane roll is less likely to wear than the rubber belt or the like.

A fourth printing system of the present disclosure includes:

a printing device;

an accommodation rack in which multiple shelf sections capable of accommodating a support frame supporting an exchanging member are provided and the support frame is movable between the printing device and the shelf sections in a state where the accommodation rack faces the printing device, and which has an opening in a side surface parallel to a movement direction of the support frame; and a delivery device including a feeding section capable of feeding in or out the support frame in the movement direction, and a moving section causing the feeding section to enter and exit from the accommodation rack through the opening, in which the feeding section includes one or more driving rolls driven in a state of abutting on the support frame in the accommodation rack, and a belt provided at a position not in contact with the support frame to transmit power to the multiple driving rolls, and the multiple driving rolls have a lower abrasiveness than the belt.

In the fourth printing system, the support frame is fed out or in by driving the driving roll in a state of abutting on the support frame. The belt does not contact the support frame. Furthermore, the driving roll is lower in abrasiveness than the belt. Therefore, compared to the case where the support frame is fed out or in by the friction force of the belt, the abrasion powder is less likely to enter the printing device.

DESCRIPTION OF EMBODIMENTS

Figure 1:
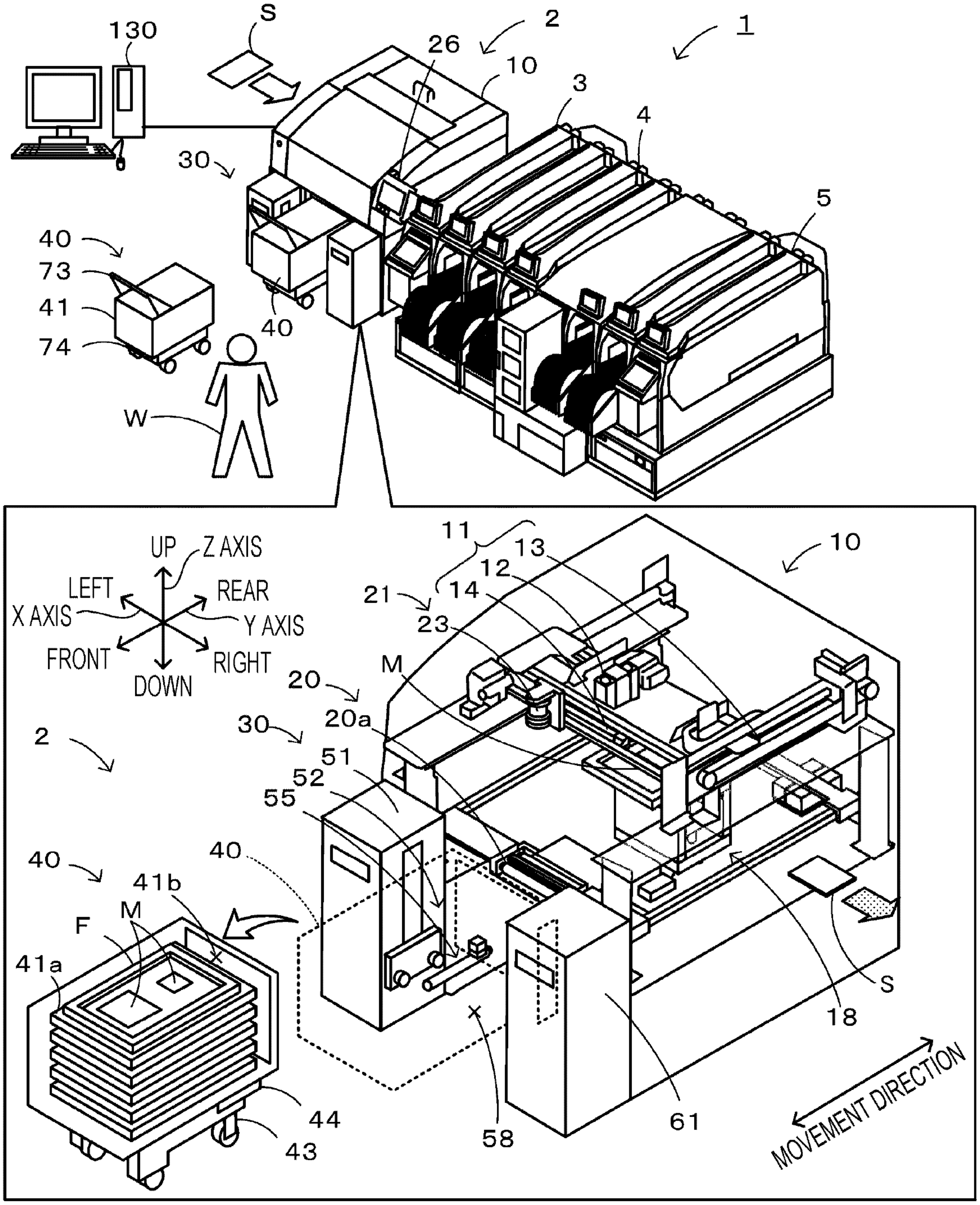
FIG. 1 is a schematic view of mounting system 1 including printing system 2.
Figure 2:
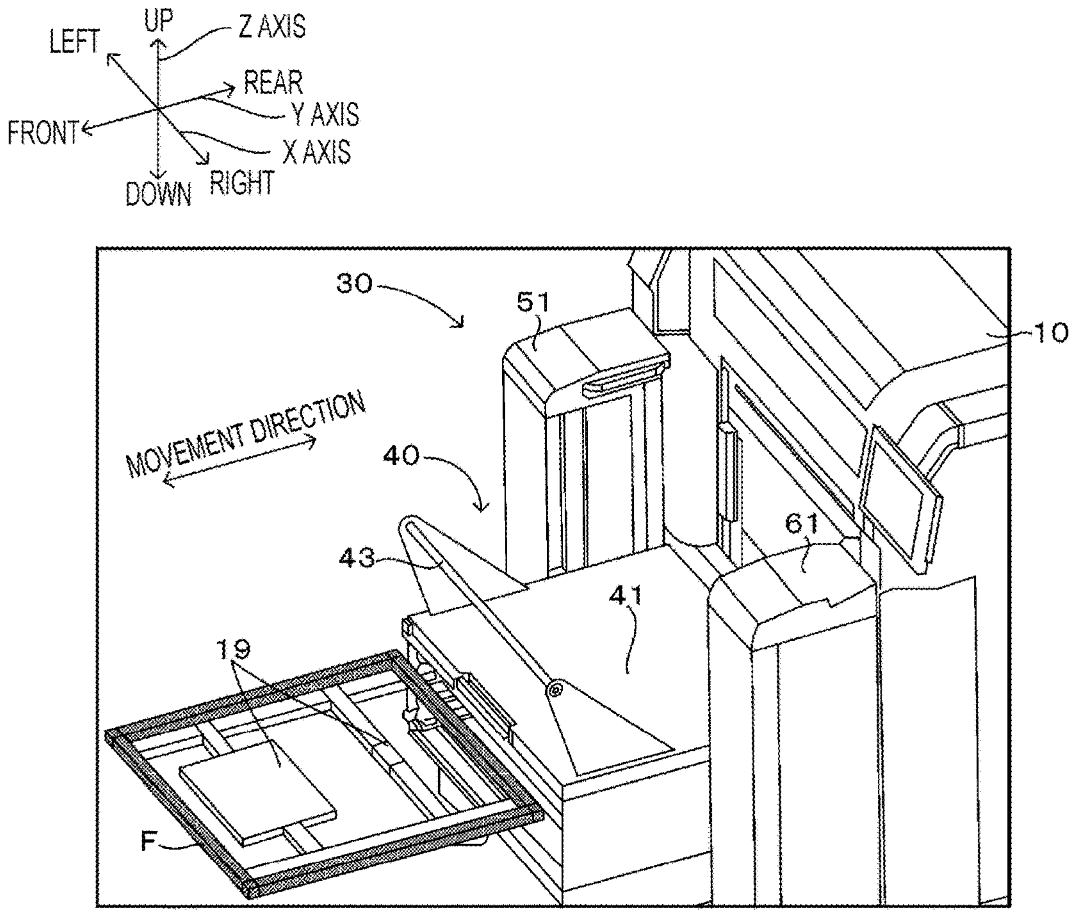
FIG. 2 is a perspective view of printing system 2.
Figure 3A:
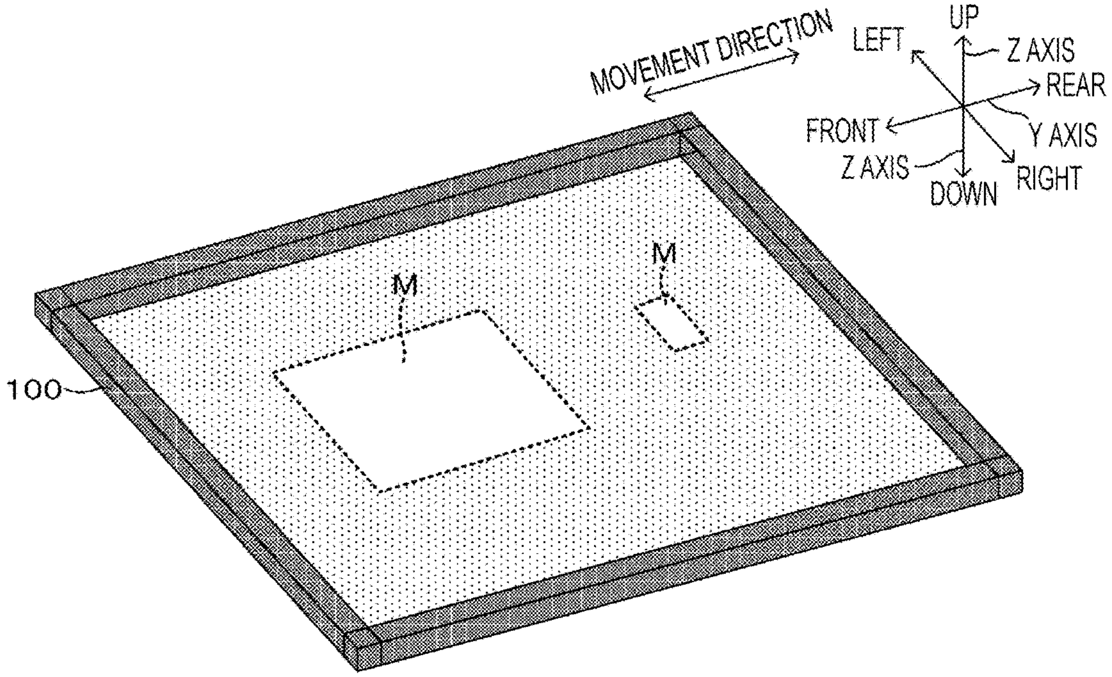
FIG. 3A is a perspective view of support frame 100.
Figure 3B:
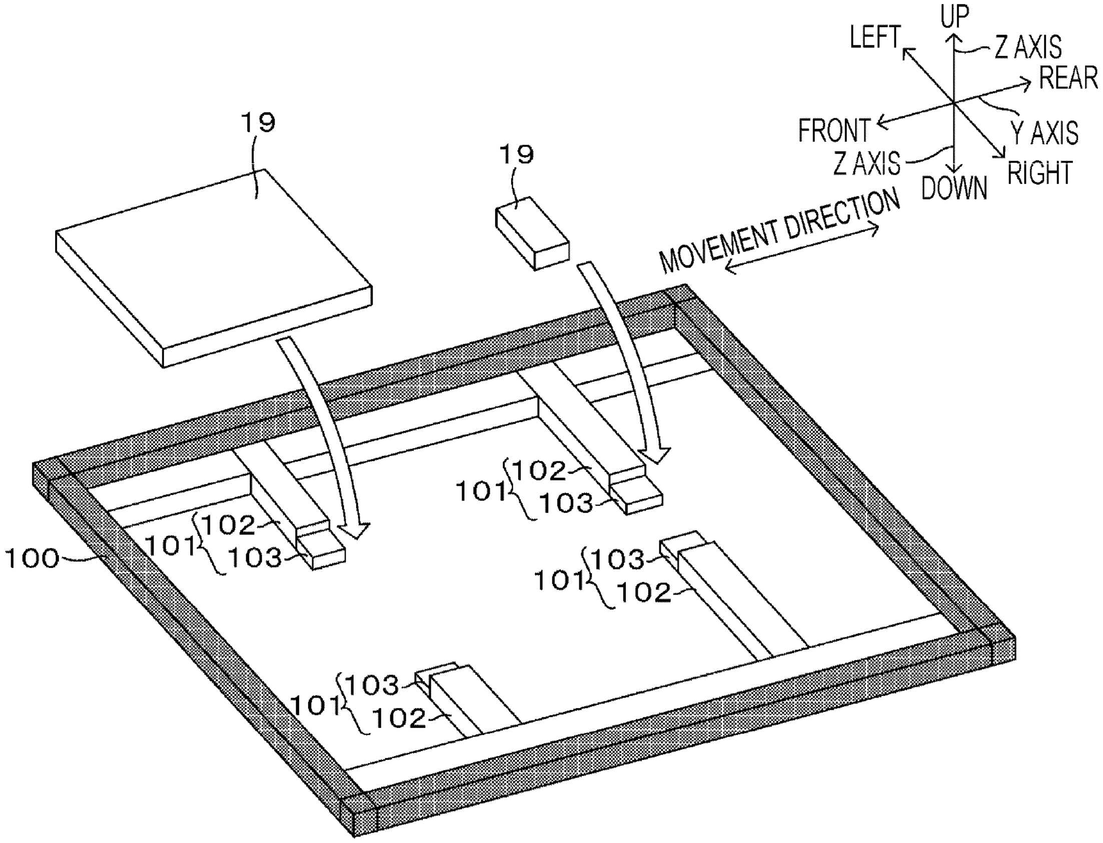
FIG. 3B is a perspective view of support frame 100.
Figure 4:
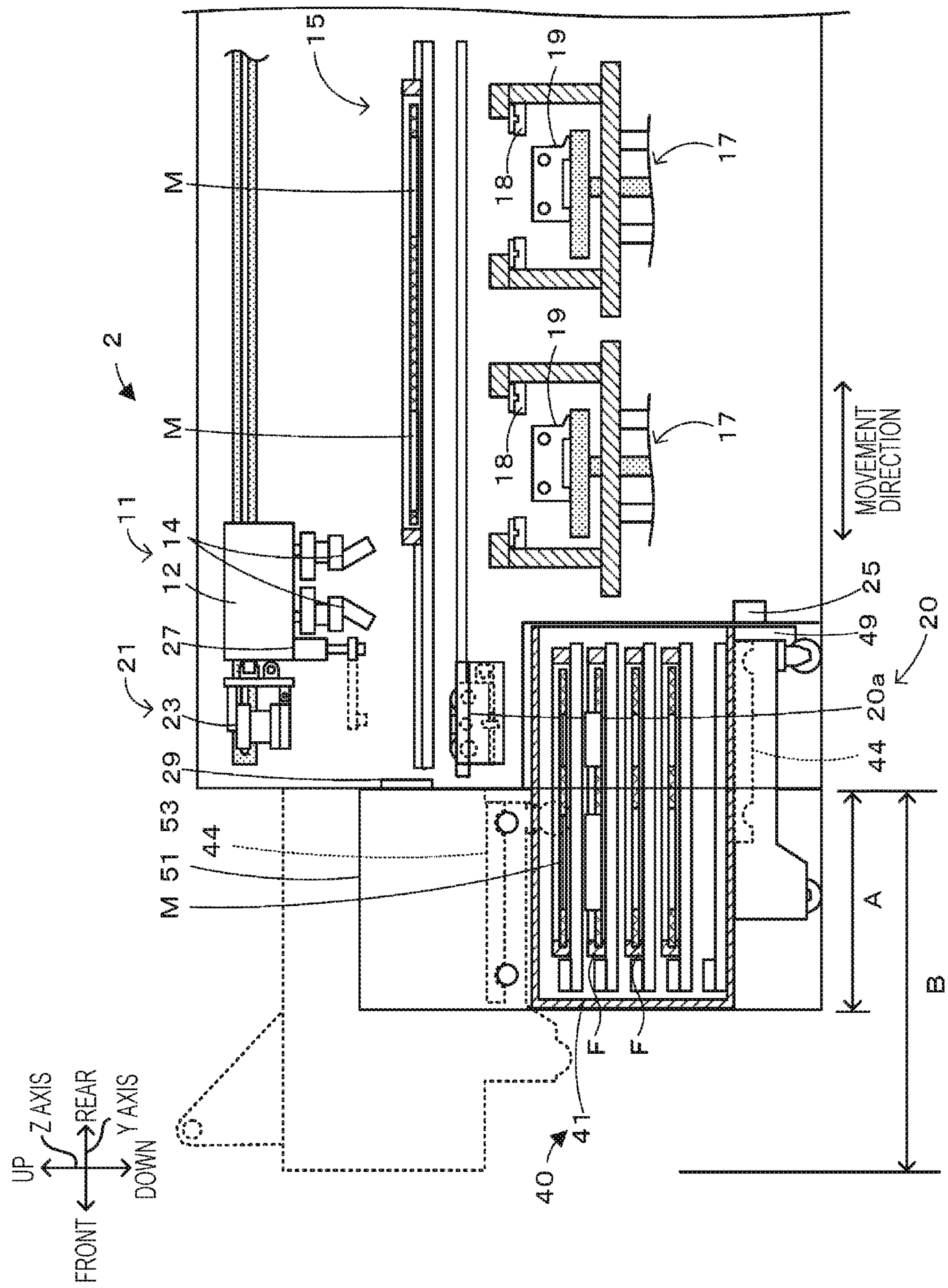
FIG. 4 is a schematic configuration diagram of printing system 2.
Figure 5:
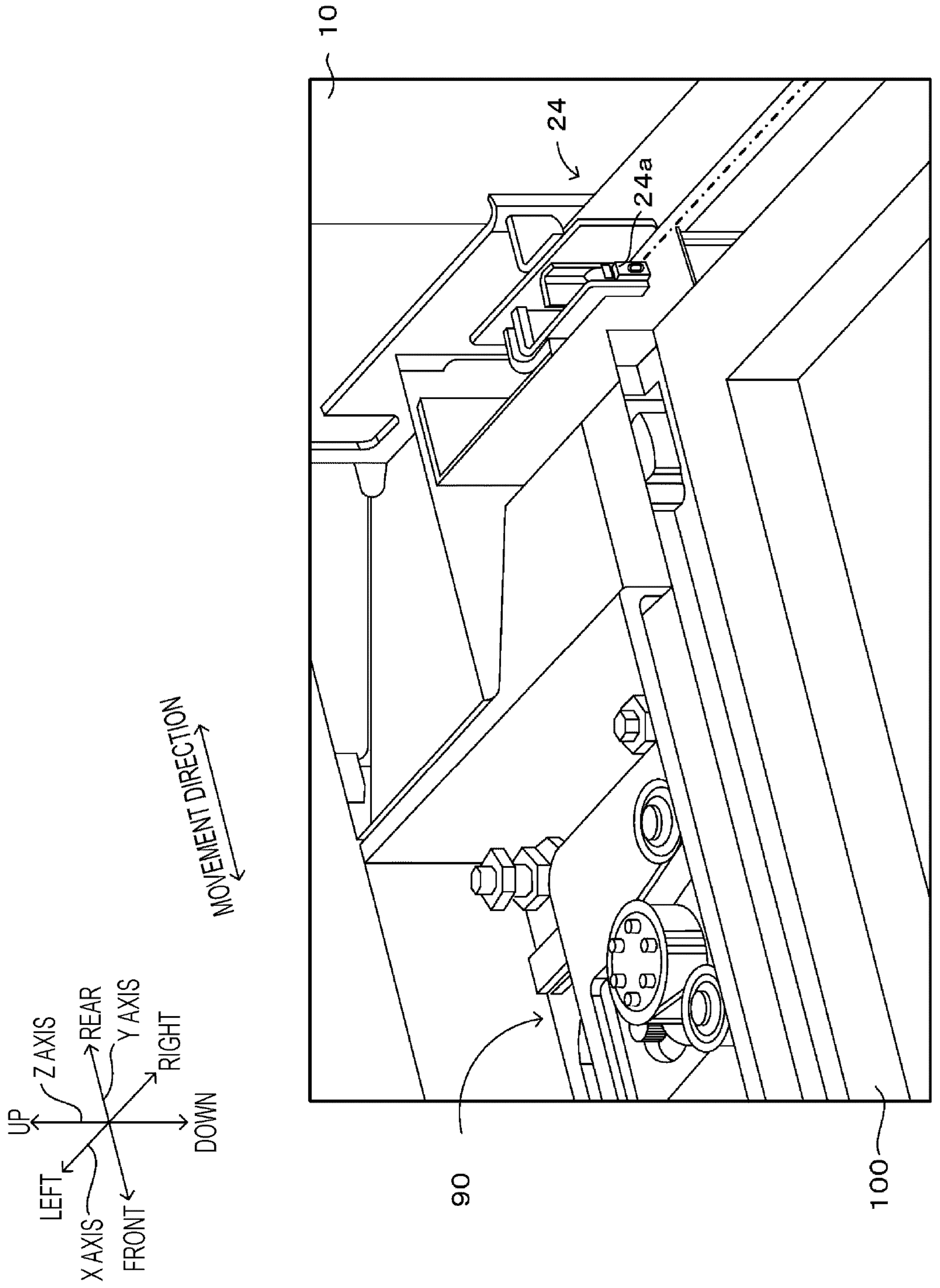
FIG. 5 is a perspective view of support frame detection sensor 24.
Figure 6A:
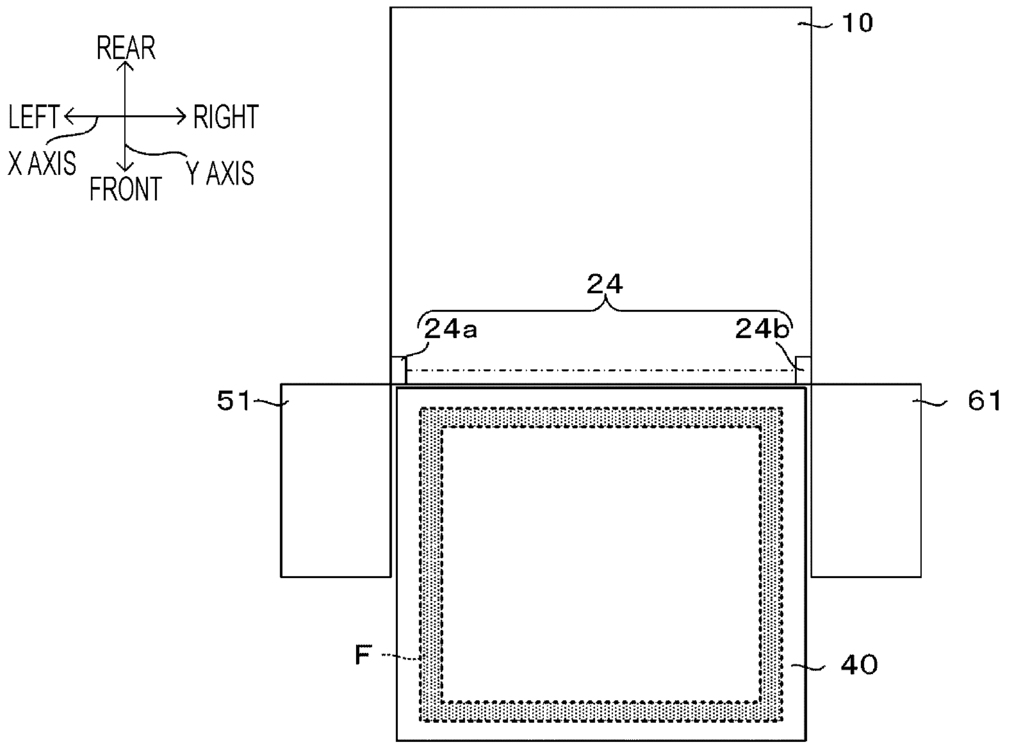
FIG. 6A is a diagram illustrating an operation of support frame detection sensor 24.
Figure 6B:
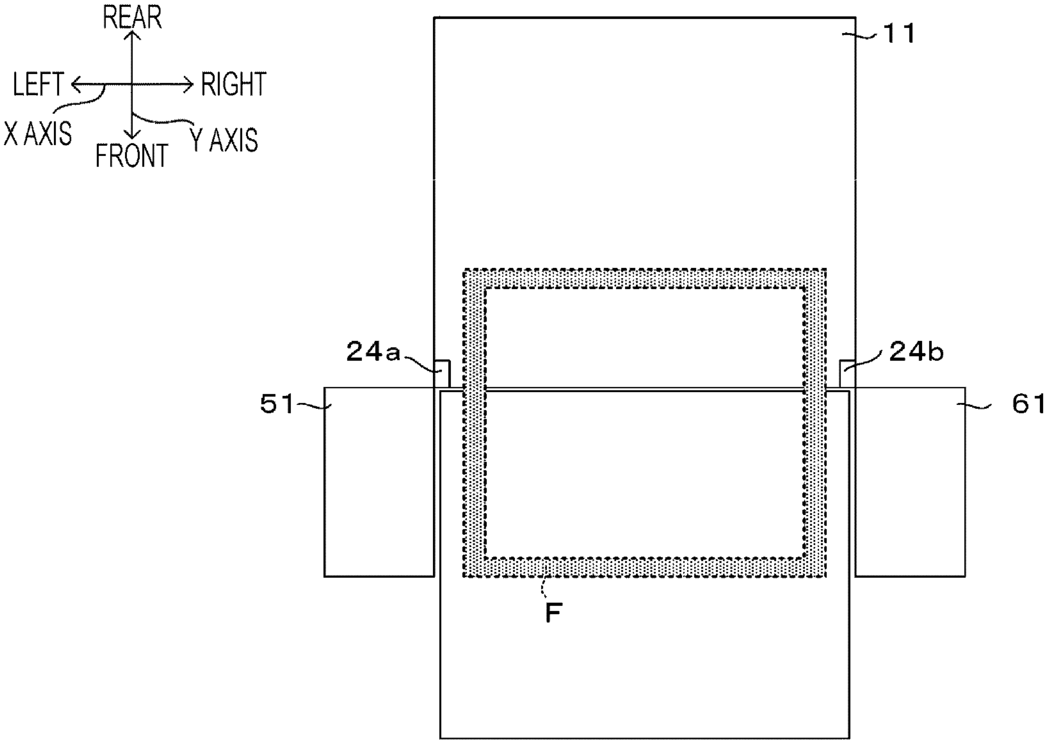
FIG. 6B is a diagram illustrating the operation of support frame detection sensor 24.
Figure 7A:
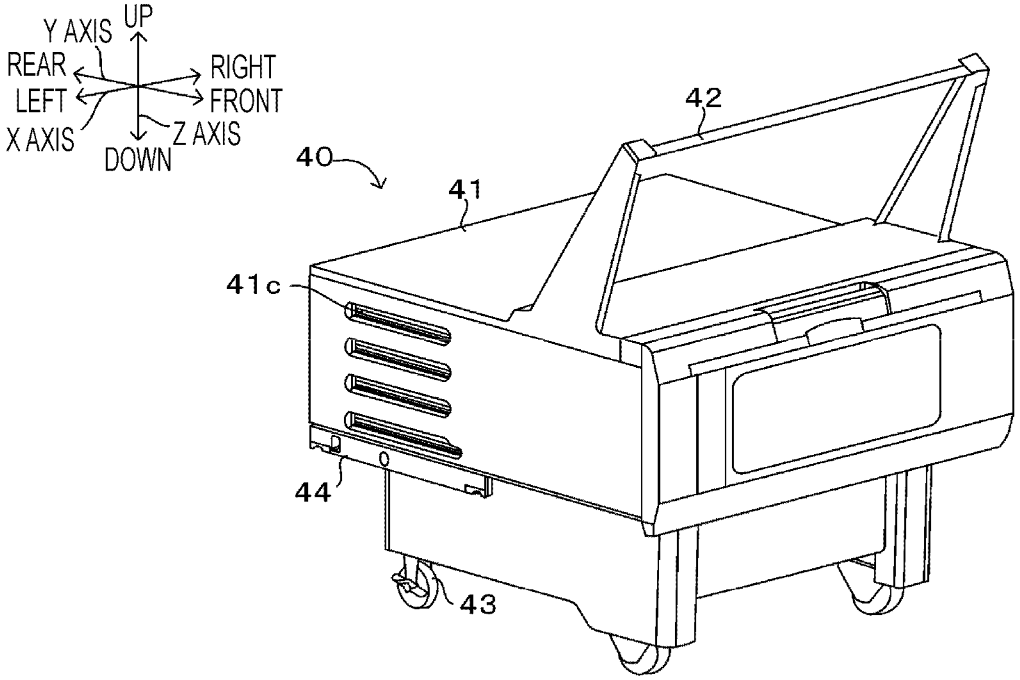
FIG. 7A is a perspective view of accommodation rack 40.
Figure 7B:
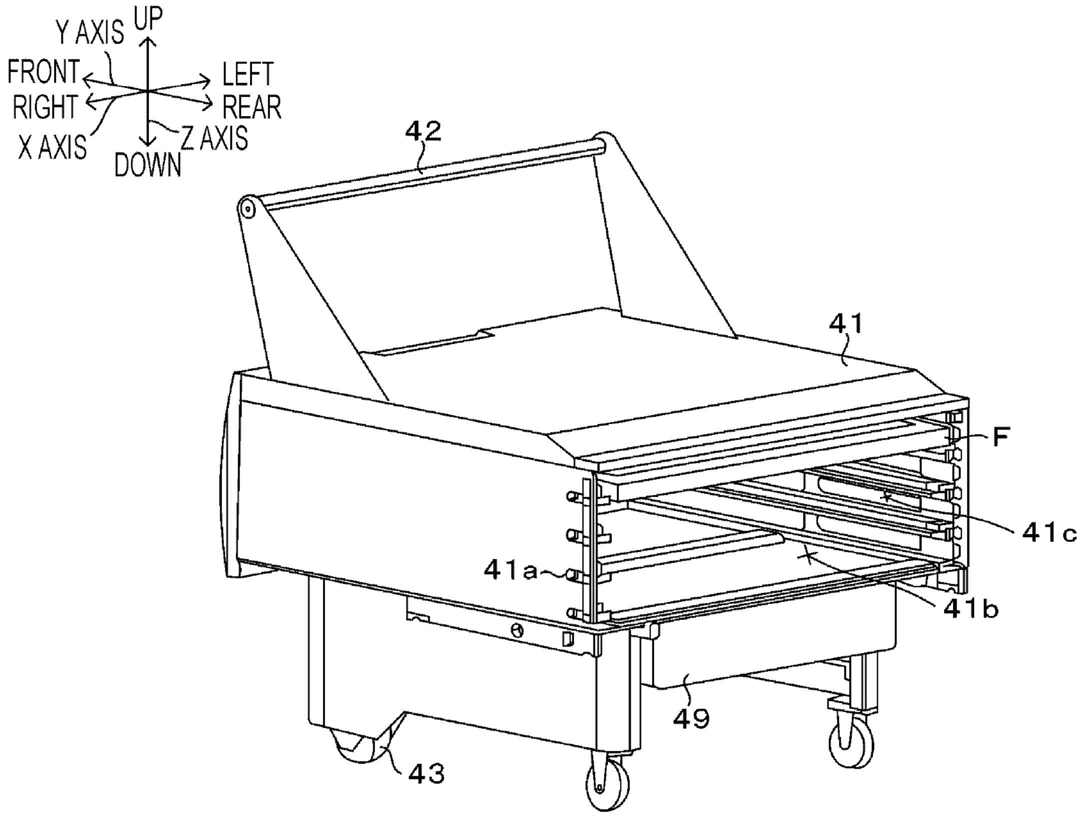
FIG. 7B is a perspective view of accommodation rack 40.
Figure 8:
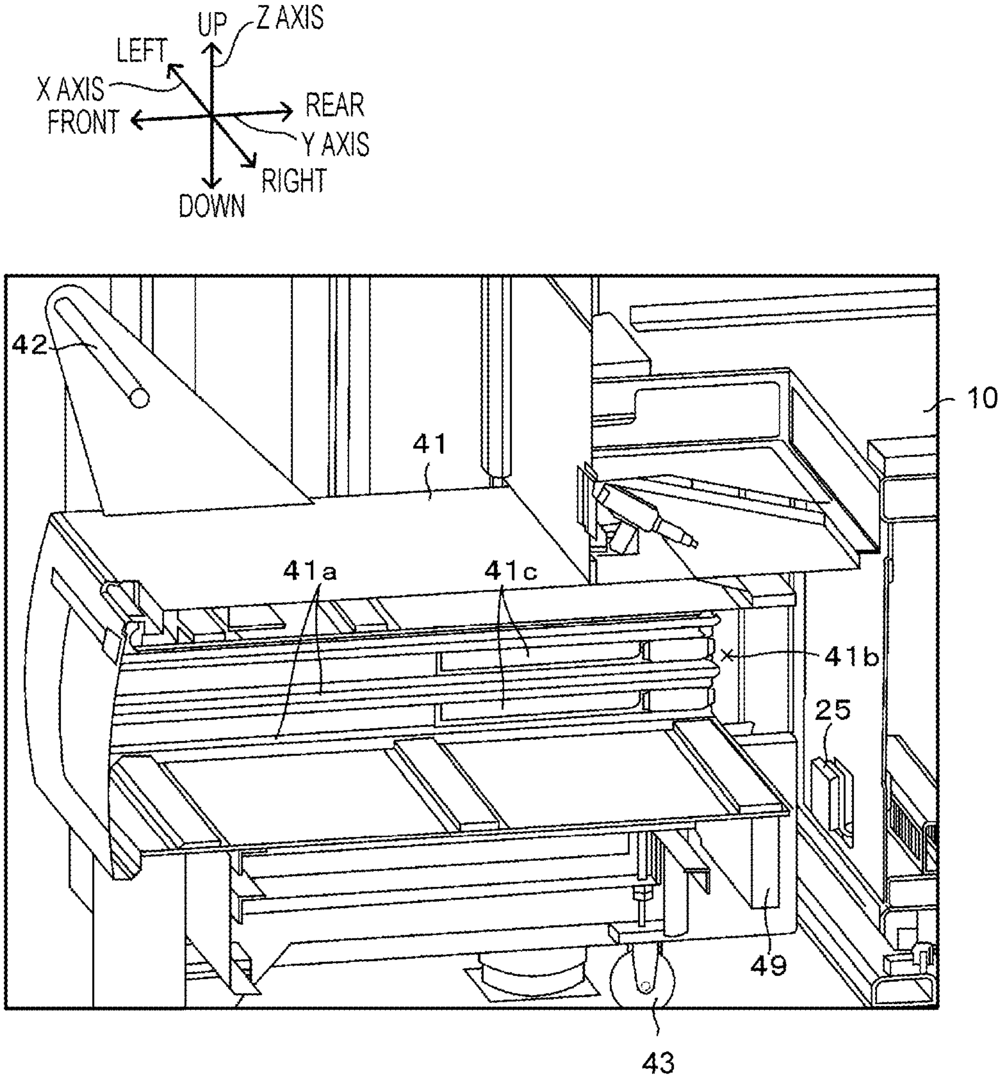
FIG. 8 is a cross-sectional view of accommodation rack 40 and printing device 10.
Figure 9:
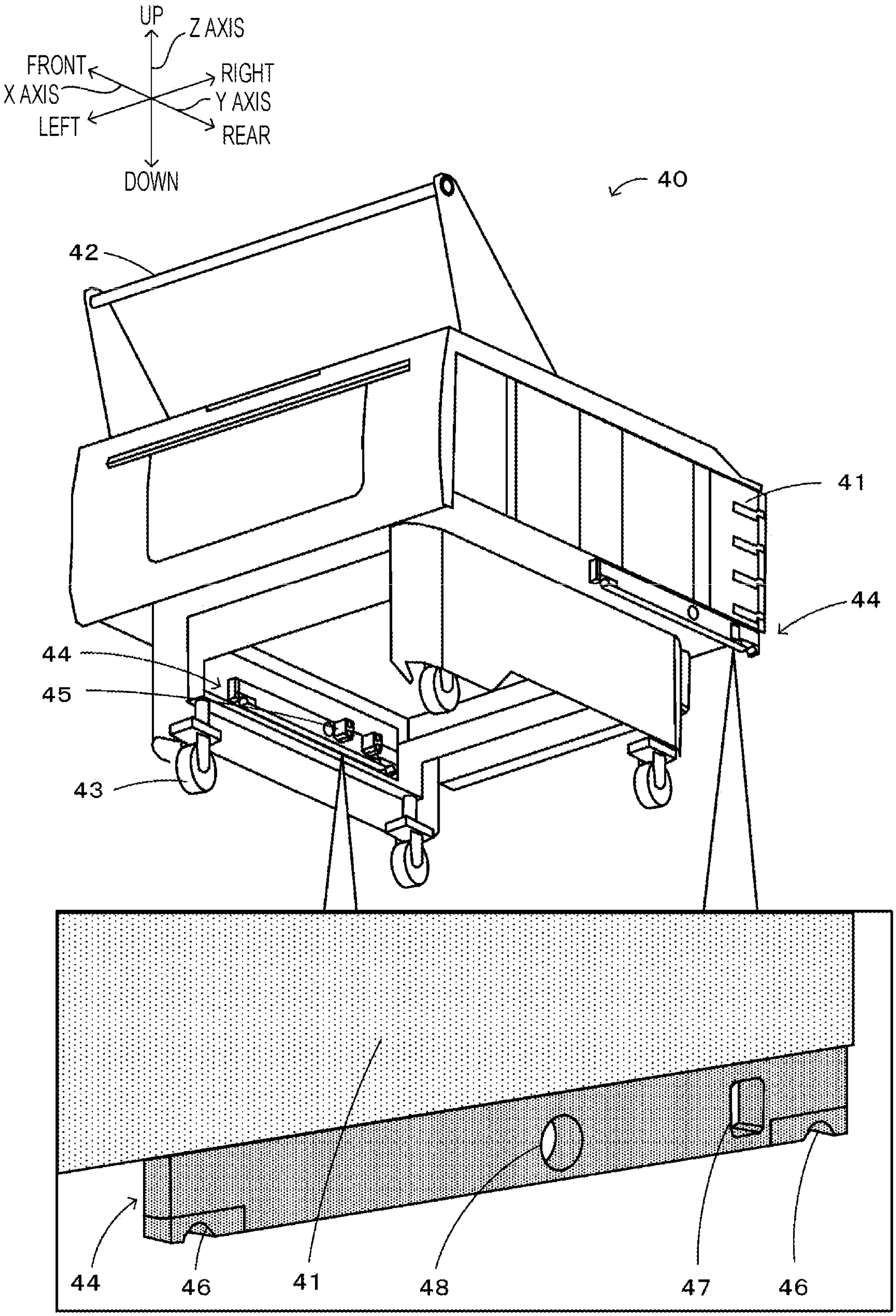
FIG. 9 is a perspective view of accommodation rack 40.
Figure 10:
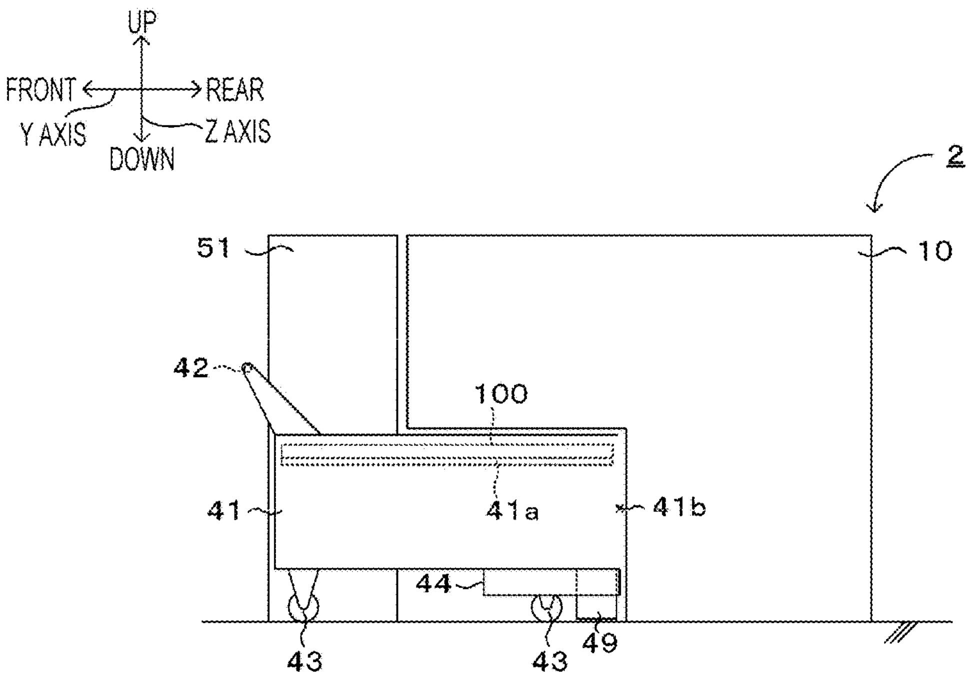
FIG. 10 is a side view of printing system 2.
Figure 11:
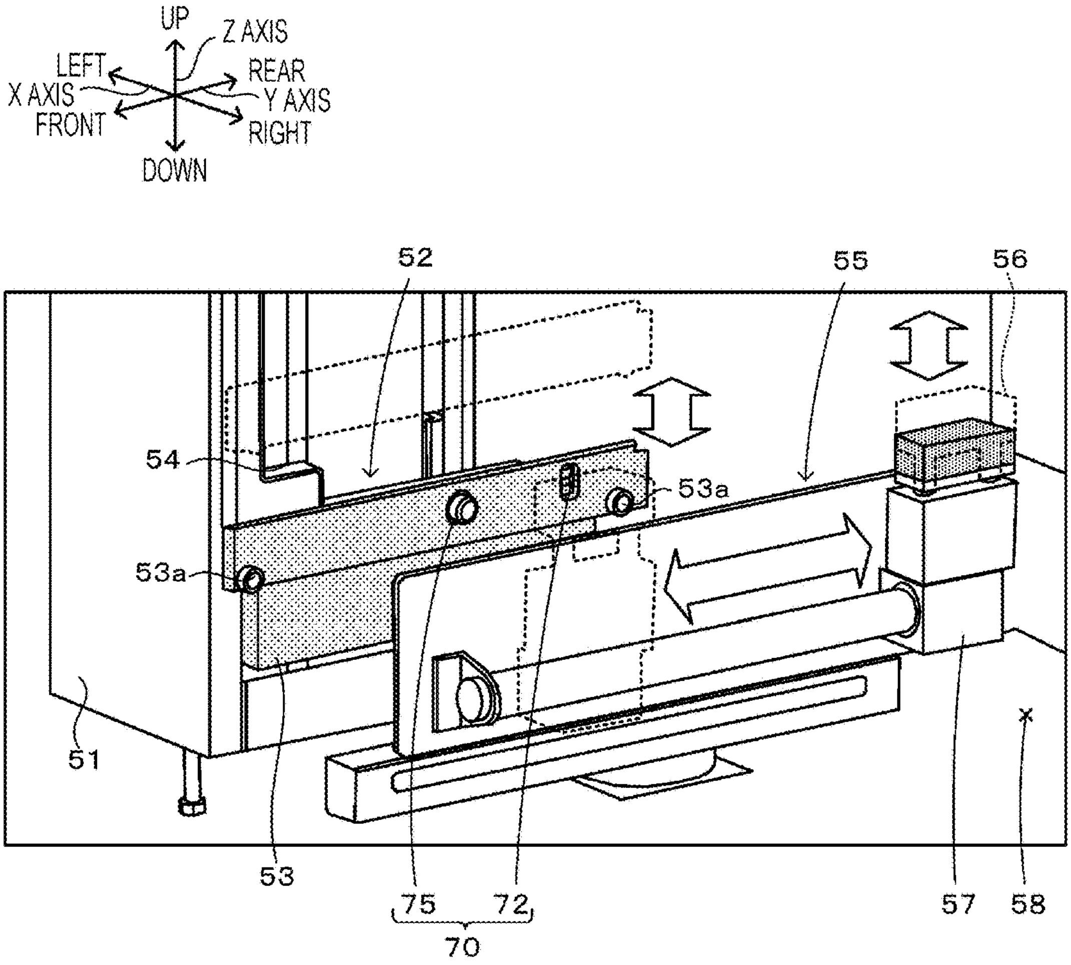
FIG. 11 is a perspective view of lifting and lowering device 52 and front-rear movement device 55.
Figure 12:
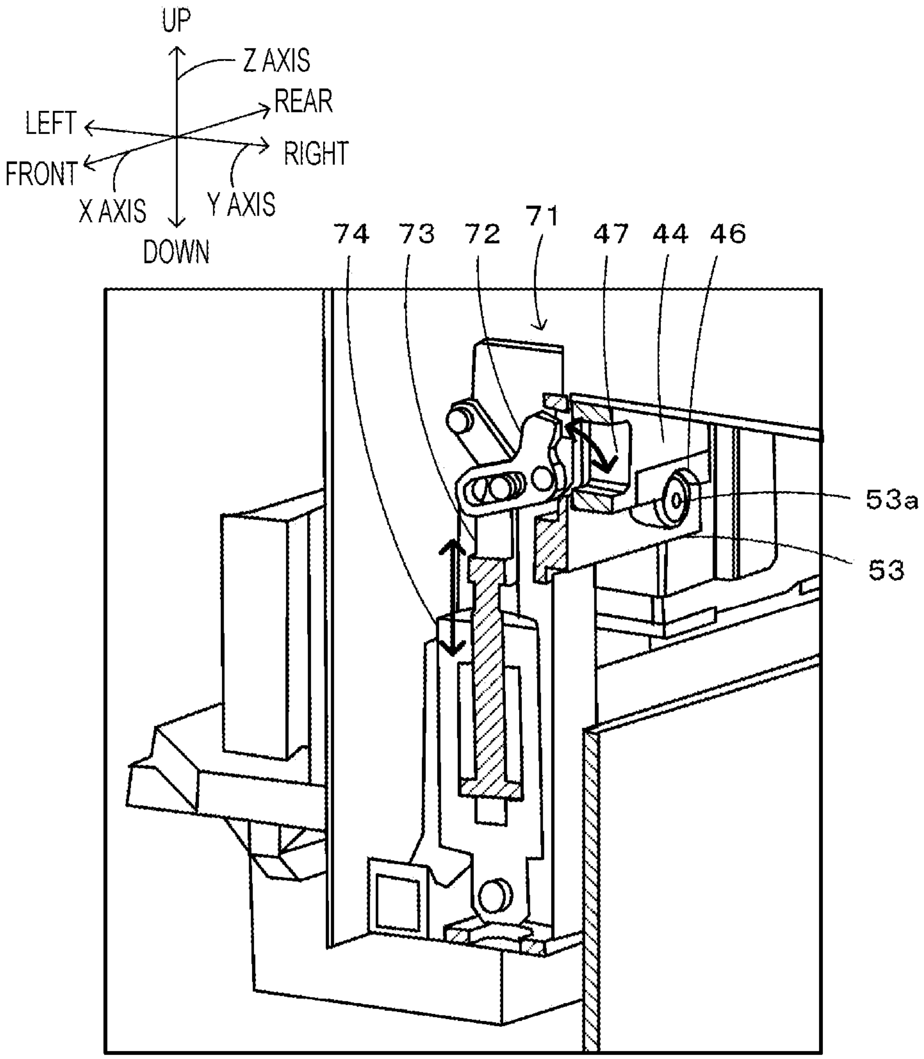
FIG. 12 is a longitudinal sectional view of clamp section 71.
Figure 13A:
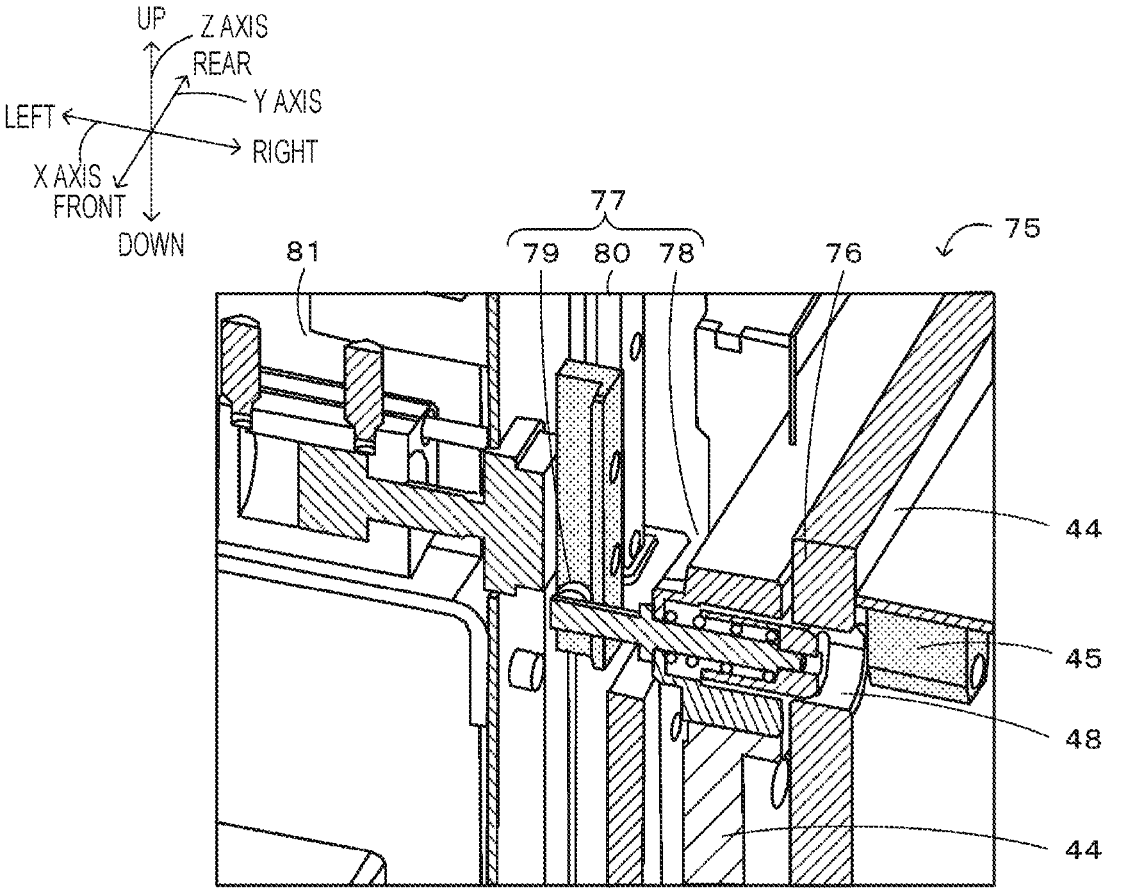
FIG. 13A is a longitudinal sectional view of stopper section 75.
Figure 13B:
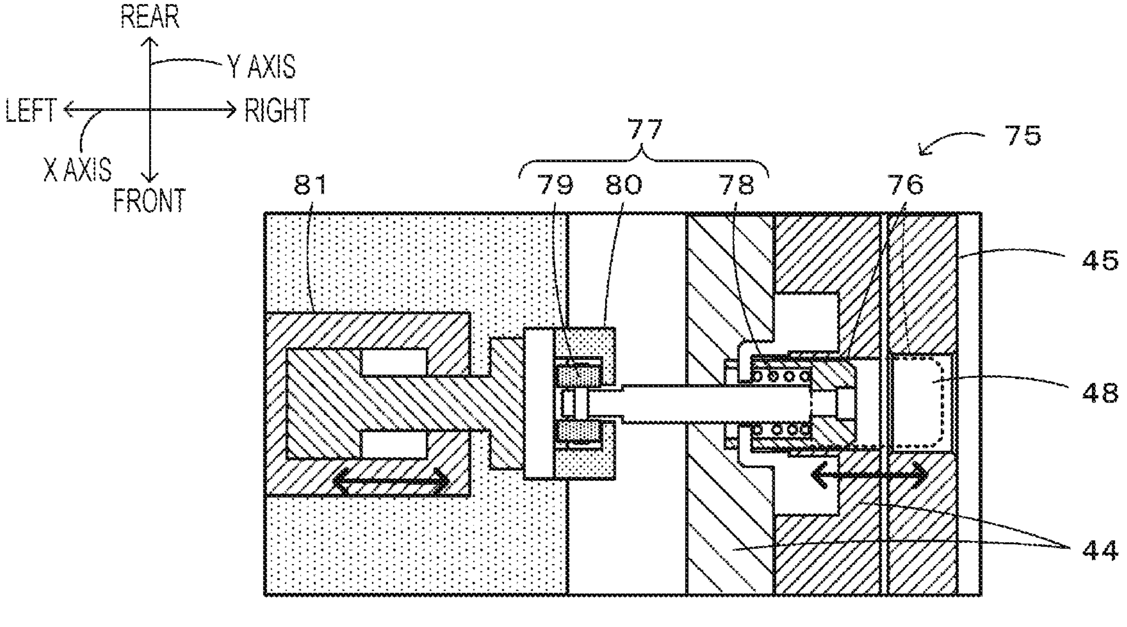
FIG. 13B is a cross-sectional view of stopper section 75.
Figure 14:
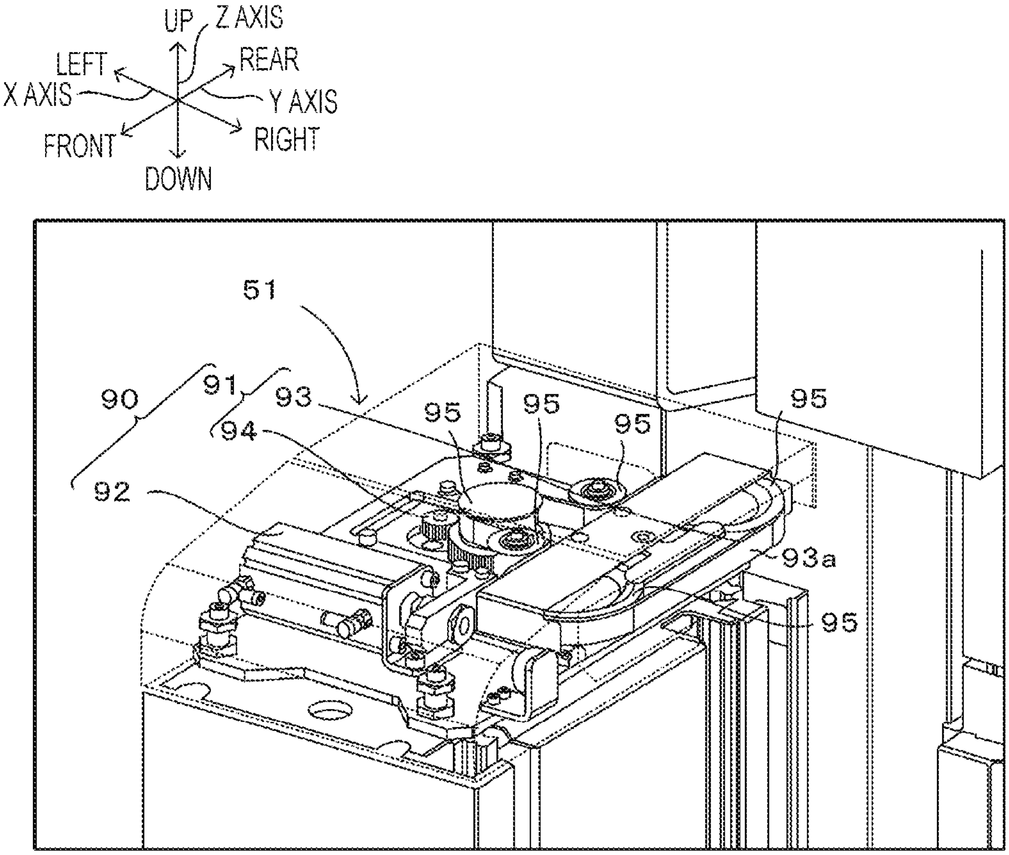
FIG. 14 is a perspective view of delivery device 90.
Figure 15A:
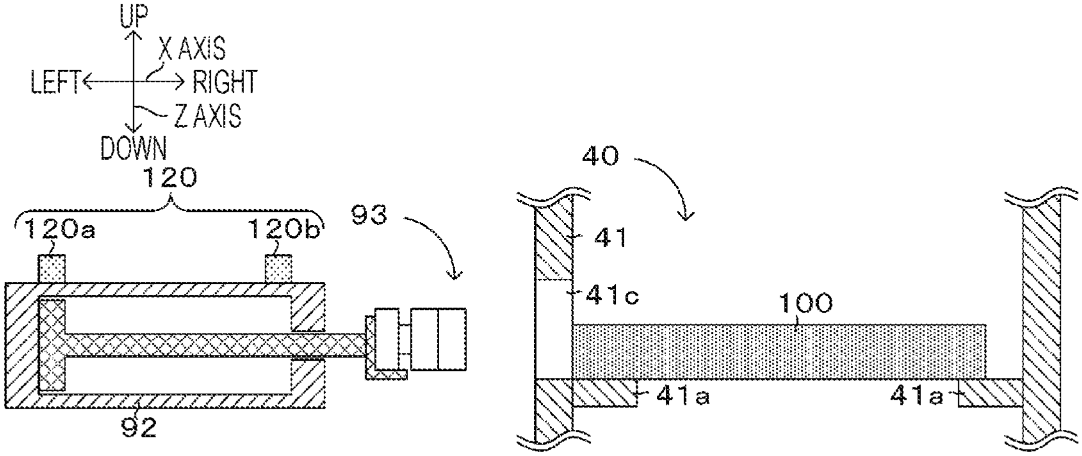
FIG. 15A is a diagram illustrating an operation of position sensor 120.
Figure 15B:
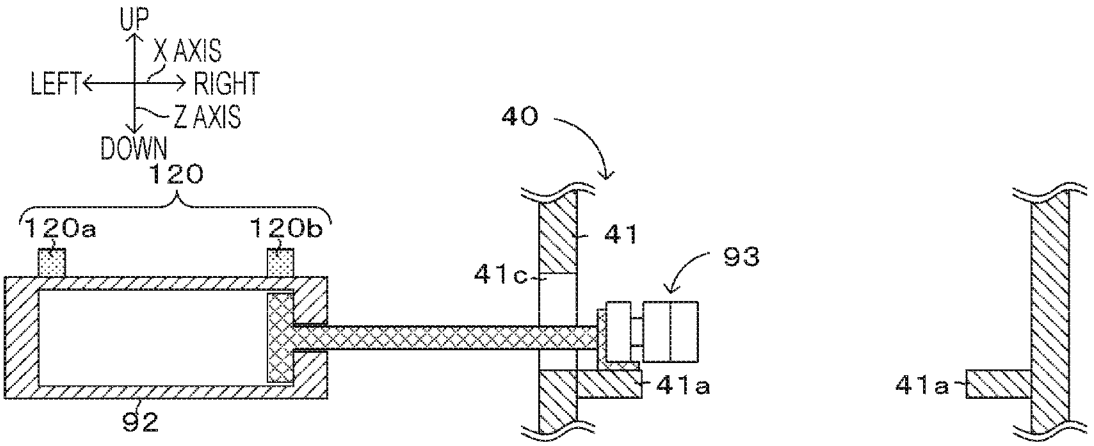
FIG. 15B is a diagram illustrating the operation of position sensor 120.
Figure 15C:
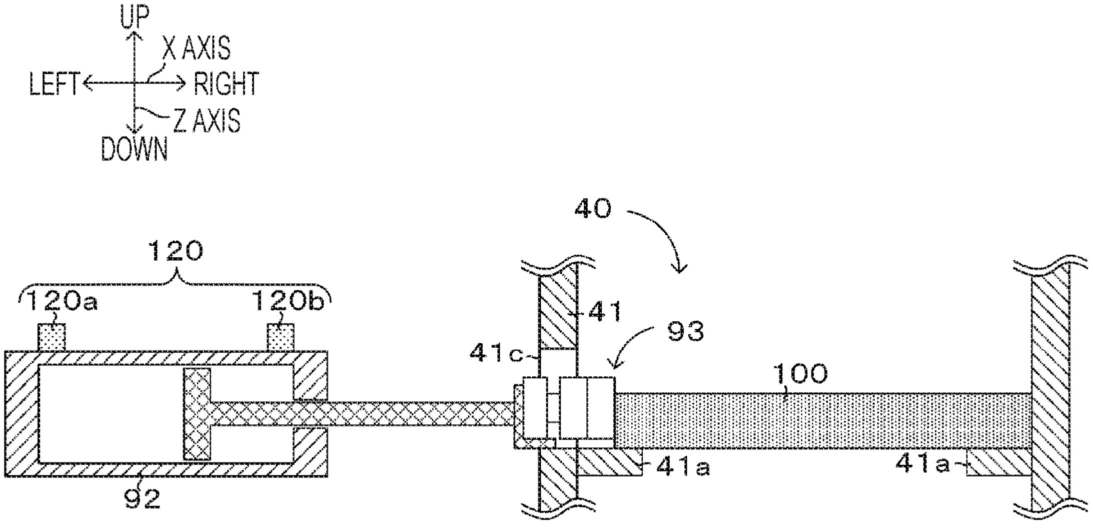
FIG. 15C is a diagram illustrating the operation of position sensor 120.
Figure 16:
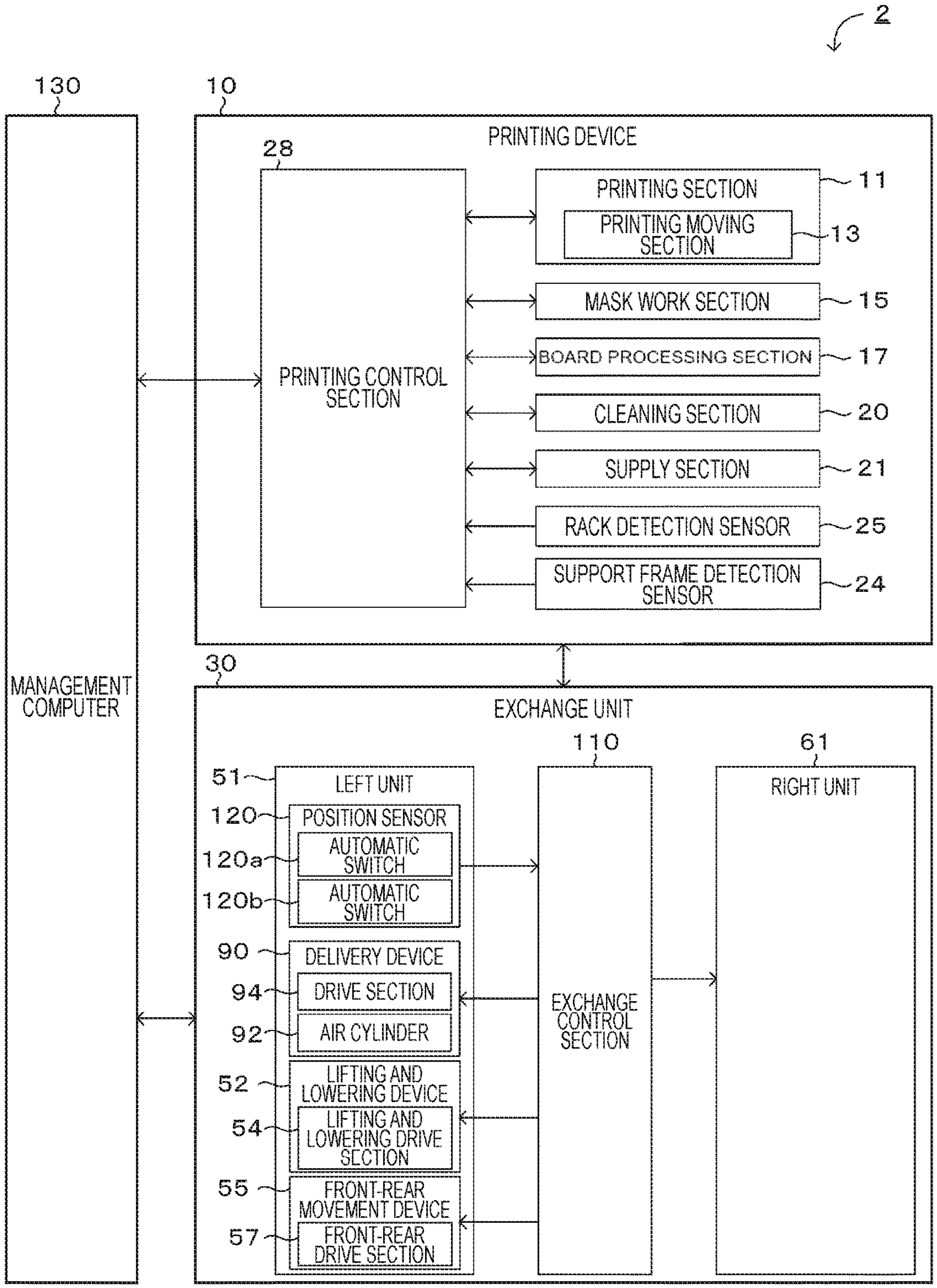
FIG. 16 is a block diagram illustrating an electrical connection relationship of printing system 2.

The present embodiment will be described below with reference to drawings. FIG. 1 is a schematic view of mounting system 1 including printing system 2. FIG. 2 is a perspective view of printing system 2. FIGS. 3A and 3B are perspective views of support frame 100. FIG. 4 is a schematic configuration diagram of printing system 2. FIG. 5 is a perspective view of support frame detection sensor 24. FIGS. 6A and 6B are diagrams illustrating an operation of support frame detection sensor 24. FIGS. 7A and 7B are perspective views of accommodation rack 40. FIG. 8 is a cross-sectional view of accommodation rack 40 and printing device 10. FIG. 9 is a perspective view of accommodation rack 40. FIG. 10 is a side view of printing system 2. FIG. 11 is a perspective view of lifting and lowering device 52 and front-rear movement device 55. FIG. 12 is a longitudinal sectional view of clamp section 71. FIGS. 13A and 13B are longitudinal sectional and cross-sectional views of stopper section 75. FIG. 14 is a perspective view of delivery device 90. FIGS. 15A to 15C are diagrams illustrating the operation of position sensor 120. FIG. 16 is a block diagram illustrating an electrical connection relationship of printing system 2. In the present embodiment, a left-right direction (X axis), a front-rear direction (Y axis), and an up-down direction (Z axis) are as illustrated in the respective drawings.

Mounting system 1 includes printing system 2, print inspection device 3, mounting device 4, mounting inspection device 5, reflow device (not illustrated), and management computer 130. Mounting system 1 is configured as a mounting line in which multiple mounting devices 4 for mounting a component on board S are arranged downstream of printing system 2.

Print inspection device 3 is a device that inspects the state of viscous fluid such as solder paste which is printed on board S by printing device 10. Mounting device 4 is a device that mounts a component on board S on which the viscous fluid is printed by printing device 10. Mounting inspection device 5 is a device that inspects, for example, the state of the component mounted on board S. The reflow device is a device that heats and melts the printed viscous fluid to make the viscous fluid secure onto board S. Management computer 130 is a device that manages information of each device of mounting system 1. Management computer 130 manages, for example, the progress status of each device of the production line which performs mounting process.

Printing system 2 includes printing device 10, support frame detection sensor 24, accommodation rack 40, exchange unit 30, and position sensor 120. As illustrated in FIG. 1, printing device 10 is a device that pushes a solder on screen mask M into a pattern hole formed in screen mask M using squeegees 14 to thereby apply (print) solder, as viscous fluid, onto board S, which is a processing target, below screen mask M through the pattern hole. Here, as the "processing target", there is raised, for example, board S on which a component is mounted, a base material which is a three-dimensional object, or the like. As the "viscous fluid", there is raised a solder paste or a conductive paste, an adhesive, or the like. Here, the following description will be made using board S and solder paste as examples.

As illustrated in FIG. 4, printing device 10 includes printing section 11, mask work section 15, board processing section 17, cleaning section 20, supply section 21, support frame detection sensor 24, rack detection sensor 25, operation panel 26 (refer to FIG. 1), and printing control section 28 (refer to FIG. 16).

Printing section 11 is a unit that is disposed at an upper stage of printing device 10 and executes a printing process to print viscous fluid on board S using screen mask M. Printing section 11 includes, as illustrated in FIG. 4, printing head 12, printing moving section 13 (refer to FIG. 16), a squeegee lifting and lowering section (not illustrated), and squeegees 14. Printing moving section 13 is configured to move printing head 12 in a predetermined printing direction (here, in the front-rear direction) and includes a guide formed in the front-rear direction, a slider configured to move along the guide, and a motor for driving the slider. Squeegee 14 is provided on a lower surface side of printing head 12 and is lifted and lowered by the squeegee lifting and lowering section. Printing section 11 has two squeegees 14 which are individually used in the front-rear direction.

As illustrated in FIG. 4, mask work section 15 is provided between printing section 11 and board processing section 17 in the up-down direction, constituting a unit for fixedly holding screen mask M. As illustrated in FIG. 4, mask work section 15 includes exchange section 27 and a mask fixing section (not illustrated). Exchange section 27 is a conveyance rod provided on printing head 12 and is lowered to a position where exchange section 27 is brought into abutment with screen mask M by an air cylinder (not illustrated), and an abutting section thereof configured to be brought into abutment with support frame 100 moves also in the front-rear direction as a result of being rotated. Printing head 12 and exchange section 27 are configured to be brought into engagement with support frame 100 between shelf section 41*a* at a predetermined height in accommodation rack 40 and printing section 11 to move support frame 100. The mask fixing section positions screen mask M, and supports and fixes screen mask M in a horizontal posture. Screen mask M is pushed to move along the guide of mask work section 15 in the front-rear direction by exchange section 27 and is fixed by the mask fixing section.

As illustrated in FIG. 4, two board processing sections 17 are provided below mask work section 15. Board processing section 17 is a unit that loads board S, positions and supports loaded board S, and brings board S into contact with and separates from screen mask M. Board processing section 17 includes board conveyance section 18 that conveys board S in the left-right direction, board support member 19 that supports board S from below; and a board lifting and lowering section that lifts and lowers entire board processing section 17 and board support member 19.

As illustrated in FIG. 4, cleaning section 20 is a unit that is provided between mask work section 15 and board processing section 17 in the up-down direction and performs a cleaning process of cleaning a rear surface of screen mask M. Cleaning section 20 has cleaning member 20*a*, and screen mask M is cleaned as a result of cleaning member 20*a* *being brought into abutment therewith.*

Supply section 21 is a unit for supplying a solder accommodated in cartridge 23 on screen mask M. As illustrated in FIG. 4, supply section 21 is provided in front of the printing head 12. Supply section 21 applies a pressure to cartridge 23 to discharge the solder from cartridge 23. Cleaning member 20*a* and cartridge 23 are consumables and are exchanged as required.

Rack detection sensor 25 constitutes a sensor for detecting whether accommodation rack 40 exists in a front interior part of printing device 10. As illustrated in FIG. 4, rack detection sensor 25 is provided at a lower part of the front surface of printing device 10. When weight 49 of accommodation rack 40 is in contact with rack detection sensor 25, rack detection sensor 25 outputs an ON signal to printing control section 28 (refer to FIG. 16). Meanwhile, when weight 49 of accommodation rack 40 is not in contact with rack detection sensor 25, rack detection sensor 25 outputs an OFF signal to printing control section 28.

Operation panel 26 is a unit that receives an input from worker W and presents information to worker W. Operation panel 26 includes a display section, which is a display, and an operation section of a touch panel type having a button.

Printing control section 28 is configured as a microprocessor which is made up mainly of CPU and controls entire printing device 10. As illustrated in FIG. 16, printing control section 28 outputs a signal to management computer 130 as an external device in addition to printing section 11, mask work section 15, board processing section 17, cleaning section 20, supply section 21, operation panel 26, and exchange unit 30. In addition to printing section 11, mask work section 15, board processing section 17, cleaning section 20, supply section 21, support frame detection sensor 24, rack detection sensor 25, operation panel 26, and exchange unit 30, printing control section 28 inputs a signal from management computer 130 as an external device. Printing control section 28 has a storage section that stores information on board S on which a printing process is executed, a printing process program for executing a printing process on board S, a member exchanging process program for causing exchange section 27 to execute an exchange process of support frame 100, and the like.

As illustrated in FIGS. 5, 6A, and 6B, support frame detection sensor 24 is an optical sensor capable of detecting an object (for example, support frame 100) positioned (hereinafter referred to as a movement path) between accommodation rack 40 and printing device 10. Support frame detection sensor 24 includes light projecting section 24*a* provided on the left side of the movement path and light receiving section 24*b* (refer to FIGS. 6A and 6B) provided on the right side of the movement path. When there is an object (for example, support frame 100) on the movement path, the object blocks light from light projecting section 24*a* and support frame detection sensor 24 outputs an OFF signal to printing control section 28 (refer to FIG. 16). Meanwhile, when there is no object in the movement path. the light from light projecting section 24*a* is received, and the ON signal is output to printing control section 28.

Accommodation rack 40 is an accommodation body that accommodates support frame 100 capable of supporting exchanging members (for example, screen mask M and board support member 19) related to the printing process performed by printing section 11. Accommodation rack 40 has, as illustrated in FIGS. 7A, 7B, and 8, rack main body 41, handle 42, caster section 43, supporting and fixing member 44, and weight 49.

As illustrated in FIG. 3A, accommodation rack 40 can accommodate support frame 100 to which screen mask M is fixed. In the present embodiment, in screen mask M, a pattern hole formed in front of support frame 100 is larger in size than the pattern hole formed in the rear of support frame 100. As illustrated in FIG. 3B, accommodation rack 40 can accommodate support frame 100 that holds board support member 19. Board support member 19 is held by holding section 101 provided in support frame 100. Holding section 101 includes pair of claw members 103 provided so that tip portions of claw members face each other. Pair of claw members 103 supports the lower surface of board support member 19. Pair of claw members 103 is normally biased upward by a spring (not illustrated), and is in a horizontally maintained closed state. When pair of claw members 103 is pushed down from above, pair of claw members 103 is in an open state of being rotated downward against the elastic force of the elastic body. Each holding section 101 can hold board support member 19 of a different size. For example, in the present embodiment, board support member 19 held by holding section 101 provided at the front side of support frame 100 is larger in size than board support member 19 held by holding section 101 provided at the rear side of support frame 100.

Rack main body 41 includes multiple (four in the present embodiment) shelf sections 41*a*, passage section 41*b*, and multiple opening portions 41*c*. Shelf sections 41*a* are arranged at predetermined intervals in the up-down direction so that support frame 100 can be placed in the up-down direction. Shelf sections 41*a* are provided on the left and right inside rack main body 41 so that end portions of support frame 100 are inserted to be supported by shelf sections 41*a*. Passage section 41*b* communicates with the outside such as printing section 11. Support frame 100 is movable in the front-rear direction (movement direction) through passage section 41*b*, and is fed into or out of rack main body 41. Opening portion 41*c* is used to cause feeding section 91 of delivery device 90 (refer to FIG. 14) to enter or exist from accommodation rack 40. Opening portion 41*c* is a groove formed on the left side surface of rack main body 41 and extending in the front-rear direction.

Handle 42 is made up of a rod-shaped member gripped by worker W and a support member that fixes the rod-shaped member. Caster section 43 is provided below rack main body 41. Caster section 43 includes a structure having a space in the center thereof and casters which are provided on a lower surface side of the structure and which each have a wheel. Worker W grips this handle 42 to move accommodation rack 40 (refer to FIG. 17).

Supporting and fixing member 44 is a plate-shaped member which is fixed to front left and right end portions on a lower surface side of rack main body 41. Supporting and fixing member 44 is a member which is used for connection to exchange unit 30. As illustrated in FIG. 9, supporting and fixing member 44 has block section 45, receiving section 46, locking hole 47, and insertion hole 48. Block section 45 constitutes a member to which hook section 56 provided in exchange unit 30 is connected, and a space into which hook section 56 is inserted is defined between two blocks. Receiving section 46 is a portion that receives cam follower 53*a* provided in rack support member 53 of exchange unit 30, and has an arc-shaped cut portion. Locking hole 47 is a through hole into which clamp lever 72 of fixing section 70 provided in rack support member 53 of exchange unit 30 is inserted. Insertion hole 48 is a through hole into which insertion pin 76 of fixing section 70 provided in rack support member 53 of exchange unit 30 is inserted.

Weight 49 is used to position the center of gravity of accommodation rack 40 on printing device 10 side (rear side) with respect to rack support member 53 of exchange unit 30 in a state where accommodation rack 40 faces printing device 10. As illustrated in FIGS. 8 to 10, weight 49 is provided behind the lower surface of rack main body 41. The mass of weight 49 is determined in consideration of the weight of the entire accommodation rack 40, the position of board support member 19, the weight of support frame 100, the weight of board support member 19 held by support frame 100, and the like.

Exchange unit 30 exchanges support frame 100 between accommodation rack 40 and printing device 10 when accommodation rack 40 is lifted and lowered. As illustrated in FIGS. 1 and 2, exchange unit 30 includes left unit 51, right unit 61, and exchange control section 110 (refer to FIG. 16). Left unit 51 is provided at a front left side of a housing of printing device 10. Right unit 61 is provided at a front right side of the housing of the printing device 10. As illustrated in FIG. 4, these left unit 51 and right unit 61 are formed such that length A along a movement direction of support frame 100 is shorter than length B of accommodation rack 40. Exchange unit 30 has lifting and lowering space 58 defined in the center between left unit 51 and right unit 61 for lifting and lowering accommodation rack 40. As illustrated in FIG. 4, exchange unit 30 accommodates accommodation rack 40 on the same surface as a front surface of a main body of exchange unit 30 or further inwards than the front surface of the main body of exchange unit 30 when accommodation rack 40 stays in an accommodation position, whereas when accommodation rack 40 stays in an exchange position, exchange unit 30 supports accommodation rack 40 in a position which protrudes further than the front surface of the main body of exchange unit 30.

As illustrated in FIG. 11, left unit 51 includes lifting and lowering device 52, front-rear movement device 55, fixing section 70, delivery device 90 (refer to FIG. 16), and exchange control section 110 (refer to FIG. 16).

Lifting and lowering device 52 is a device that lifts and lowers accommodation rack 40 between an exchange position when support frame 100 is exchanged between accommodation rack 40 and printing device 10 and an operation position below the exchange position. As illustrated in FIG. 11, lifting and lowering device 52 includes rack support member 53 and lifting and lowering drive section 54. Rack support member 53 is a plate-shaped member that receives accommodation rack 40 and supports accommodation rack 40 from the left side of the lower surface. Rack support member 53 is provided on a surface of left unit 51 facing right unit 61. Rack support member 53 is provided with cam follower 53*a* at front and rear end portions thereof. Cam follower 53*a* supports the supporting and fixing member 44 provided in accommodation rack 40 from below, and vertically moves accommodation rack 40 in accordance with the vertical movement of rack support member 53. For example, lifting and lowering drive section 54 may be configured to have a ball screw having a lifting and lowering shaft and a drive motor to vertically move rack support member 53 or may be configured to vertically move rack support member 53 using a linear motor.

Front-rear movement device 55 is configured to move accommodation rack 40 between the operation position where accommodation rack 40 can be lifted and lowered by lifting and lowering device 52 and the accommodation position where accommodation rack 40 enters the interior part of the housing of printing device 10. Front-rear movement device 55 moves accommodation rack 40 in the horizontal direction. As illustrated in FIG. 11, front-rear movement device 55 includes hook section 56 and front-rear drive section 57. Hook section 56 is provided to be lifted and lowered on the axis of front-rear drive section 57. Hook section 56 is a member that is lifted toward block section 45 provided in accommodation rack 40 and engages with block section 45. Front-rear drive section 57 is configured to move hook section 56 between the accommodation position and the operation position. Front-rear drive section 57 may be configured to have a ball screw and a drive motor to move hook section 56 forward and backward or may be configured to move hook section 56 forward and backward using a linear motor.

As illustrated in FIG. 11, fixing section 70 is a safety mechanism that prevents unintended movement and fall of accommodation rack 40 when accommodation rack 40 is lifted and lowered by lifting and lowering device 52. Fixing section 70 includes clamp section 71 and stopper section 75.

As illustrated in FIG. 12, clamp section 71 has clamp lever 72 configured to be inserted into locking hole 47 formed in supporting and fixing member 44 of accommodation rack 40, thereby constituting a mechanism that restricts accommodation rack 40 from moving in the horizontal direction. Clamp section 71 is provided in rack support member 53 and lifted and lowered together with rack support member 53. Clamp section 71 includes clamp lever 72, lever rotating section 73, and air cylinder 74. Clamp lever 72 has a lever configured to be inserted into locking hole 47, a rotation shaft fixed to rack support member 53 to rotate the lever, and an elliptic hole into which a pin of lever rotating section 73 is inserted. Lever rotating section 73 is a member which is coupled directly to a rod of air cylinder 74 for linear movement. A pin inserted into the elliptic hole is provided at the tip of the lever rotating section 73. Air cylinder 74 constitutes a drive section in which a rod is vertically moved by means of compressed air which is supplied from an air supply device (not illustrated). In clamp section 71, when the rod of air cylinder 74 is lifted up, clamp lever 72 rotates about the rotation shaft, whereby the lever is inserted into locking hole 47. In addition, in this clamp section 71, when the rod of air cylinder 74 is lowered, clamp lever 72 rotates about the rotation shaft, whereby the lever inserted in locking hole 47 is released therefrom.

As illustrated in FIGS. 13A and 13B. stopper section 75 has insertion pin 76 configured to be inserted into insertion hole 48 formed in supporting and fixing member 44 of accommodation rack 40, constituting a mechanism that prevents accommodation rack 40 from falling as a result of insertion pin 76 being inserted into insertion hole 48 when accommodation rack 40 is lifted. Stopper section 75 has insertion pin 76 and pin drive section 77. Pin drive section 77 causes insertion pin 76 to be inserted into insertion hole 48 when accommodation rack 40 is lifted from the operation position, whereas when accommodation rack 40 stays in the operation position, pin drive section 77 causes insertion pin 76 to be pulled in to release the insertion of insertion pin 76 into insertion hole 48. This pin drive section 77 includes spring 78, cam follower 79, guide member 80, and air cylinder 81. Insertion pin 76, spring 78, and cam follower 79 are provided in rack support member 53 and lifted and lowered together with rack support member 53. Meanwhile, guide member 80 and air cylinder 81 are provided at the operation position on the housing side of exchange unit 30, and are not lifted and lowered. Spring 78 is a member that biases insertion pin 76 towards insertion hole 48 side at all times. Insertion pin 76 constitutes a member configured to be inserted into insertion hole 48 and is a cylindrical member having an interior space. Spring 78 is provided in the internal space of insertion pin 76. Cam follower 79 is provided at the rear end of insertion pin 76. Cam follower 79 is brought into abutment with a wall section of guide member 80 to be lifted and lowered together with rack support member 53 while being guided by guide member 80. Guide member 80 constitutes a member having a shape in which two members, which each have an L-shaped section and whose longitudinal direction follows the up-down direction, face each other. In guide member 80, the L-shaped wall section is formed in the up-down direction, so that cam follower 79 moves along this wall section. Guide member 80 is fixed to a rod of air cylinder 81. Air cylinder 81 constitutes a drive section that drives the rod in a horizontal direction by means of compressed air supplied from an air supply device (not illustrated). When the rod of air cylinder 81 is pushed out when rack support member 53 is at the operation position. stopper section 75 is in a state where insertion pin 76 biased by spring 78 protrudes from rack support member 53 (refer to FIG. 13A). In a case where the rod of air cylinder 81 is pulled when rack support member 53 is at the operation position. stopper section 75 is brought into a state in which insertion pin 76 is pulled through guide member 80 and cam follower 79 and does not protrude from rack support member 53 (refer to FIG. 13B). Further, stopper section 75 is such that when rack support member 53 is lifted from the operation position, cam follower 79 is released from the abutment with guide member 80, causing a state in which insertion pin 76 is inserted in insertion hole 48 at all times by means of the biasing force of spring 78.

Delivery device 90 exchanges support frame 100 between accommodation rack 40 and printing device 10 by driving feeding section 91 in a state in which feeding section 91 abuts on support frame 100. As illustrated in FIG. 14, delivery device 90 includes feeding section 91 and air cylinder 92. Feeding section 91 includes belt 93 and drive section 94 that rotates belt 93. Belt 93 moves support frame 100 to printing device 10 side or accommodation rack 40 side by the friction force of surface 93*a*. Drive section 94 is configured as, for example, a servo motor. As illustrated in FIG. 14, feeding section 91 is configured such that the power of drive section 94 is transmitted to belt 93 via multiple pulleys 95. Air cylinder 92 causes feeding section 91 to enter and exit from accommodation rack 40 via opening portion 41*c*. A magnet is provided on the piston of air cylinder 92.

Moreover, right unit 61 has the same configuration as left unit 51 except that right unit 61 faces left unit 51 and does not include a delivery device, and a detailed description thereof is omitted. Right unit 61 includes a rack support member, a cam follower, a lifting and lowering drive section, a forward/backward moving section, a hook section, and a front-rear drive section.

Exchange control section 110 is configured as a microprocessor mainly including CPU, and controls entire exchange unit 30. As illustrated in FIG. 16, exchange control section 110 outputs signals to lifting and lowering drive section 54, front-rear drive section 57, and printing control section 28. Exchange control section 110 receives signals from printing control section 28, management computer 130, position sensor 120, and the like.

Position sensor 120 is a sensor capable of detecting the position of feeding section 91 in the left-right direction. Position sensor 120 includes two automatic switches 120*a* and 120*b*. Automatic switches 120*a* and 120*b* are attached to the cylinder tube of air cylinder 92. Automatic switches 120*a* and 120*b* have magnetic detection elements capable of detecting magnetism. Automatic switches 120*a* and 120*b* detect magnetism when the magnet provided in the piston of air cylinder 92 approaches the magnetoresistive element. As illustrated in FIG. 15A, in a state in which the piston of air cylinder 92 is positioned at the leftmost end (hereinafter referred to as a "backward end"), automatic switch 120*a* outputs an ON signal to exchange control section 110, and automatic switch 120*b* outputs an OFF signal to exchange control section 110. At this time, feeding section 91 is positioned outside accommodation rack 40. As illustrated in FIG. 15B, when the piston of air cylinder 92 is moved from the backward end side to the right side in a state in which support frame 100 is not accommodated in shelf section 41*a*, feeding section 91 enters the inside of accommodation rack 40 (hereinafter, this state is referred to as "swing"), and the piston is positioned at the rightmost end (hereinafter referred to as a forward end). At this time, automatic switch 120*a* outputs an OFF signal to exchange control section 110, and automatic switch 120*b* outputs an ON signal to exchange control section 110. As illustrated in FIG. 15C, when the piston of air cylinder 92 is moved from the backward end side to the forward end side in a state where there is support frame 100 in shelf section 41*a*, feeding section 91 abuts on support frame 100, and the piston is positioned between the backward end and the forward end. At this time, automatic switches 120*a* and 120*b* output an OFF signal to exchange control section 110.

Figure 17:
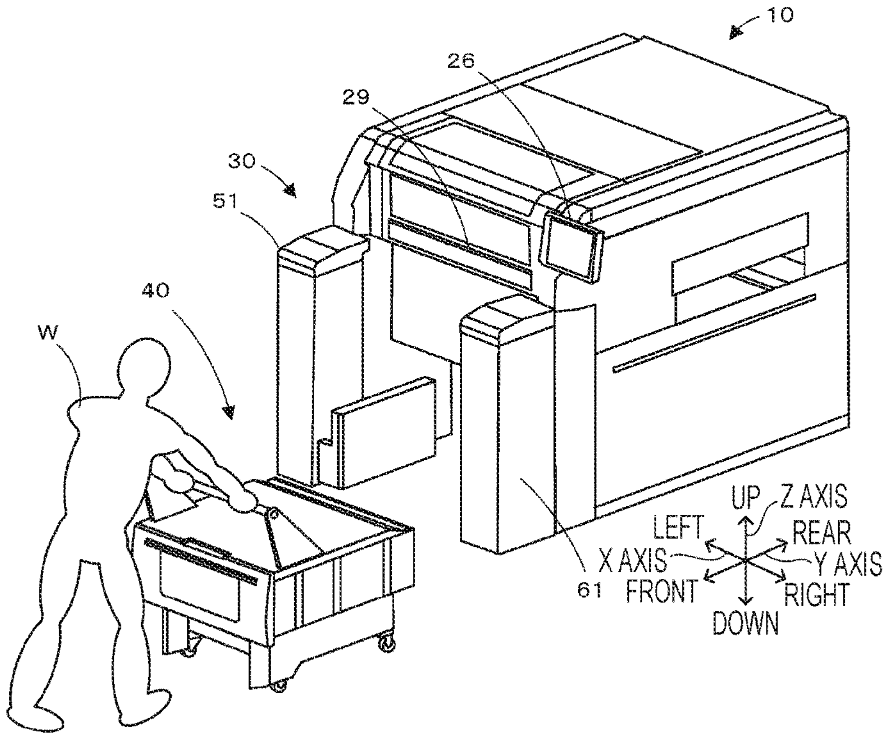
FIG. 17 is a diagram illustrating a state in which worker W moves accommodation rack 40 to exchange unit 30.

Next, a printing process of printing device 10 configured as described heretofore will be described with reference to FIG. 17. Worker W performs work of mounting accommodation rack 40 in exchange unit 30 to execute a printing process. FIG. 17 is a diagram illustrating a way by which worker W moves accommodation rack 40 to exchange unit 30. Worker W inputs an execution of a printing process from operation panel 26 after worker W has mounted accommodation rack 40 in exchange unit 30. A printing process routine for executing the printing process is stored in the storage section of printing control section 28, and the printing process routine is executed after printing control section 28 has received a printing process execution command as an input from worker W. When the printing process routine is started, firstly, CPU of printing control section 28 executes a process of bringing board S into abutment with screen mask M by causing board processing section 17 to convey, fix, and lift board S. For this, CPU causes mask work section 15 to adjust the position of screen mask M to thereby perform a position alignment between a pattern hole and board S. Subsequently, the CPU moves cartridge 23 to above screen mask M and then causes cartridge 23 to discharge the solder. Then, the CPU causes squeegees 14 to be lowered while causing printing head 12 to move, so that squeegees 14 are brought into abutment with an upper surface of screen mask M while being caused to move in the front-rear direction to print the solder on board S. In this way, printing control section 28 performs the printing process including the board conveyance and fixation process, the solder supply process, and the squeegee moving process to thereby execute printing on board S. The CPU repeatedly executes this printing process while exchanging screen mask M until the production process of producing all types of boards S in the production plan is completed.

Figure 18A:
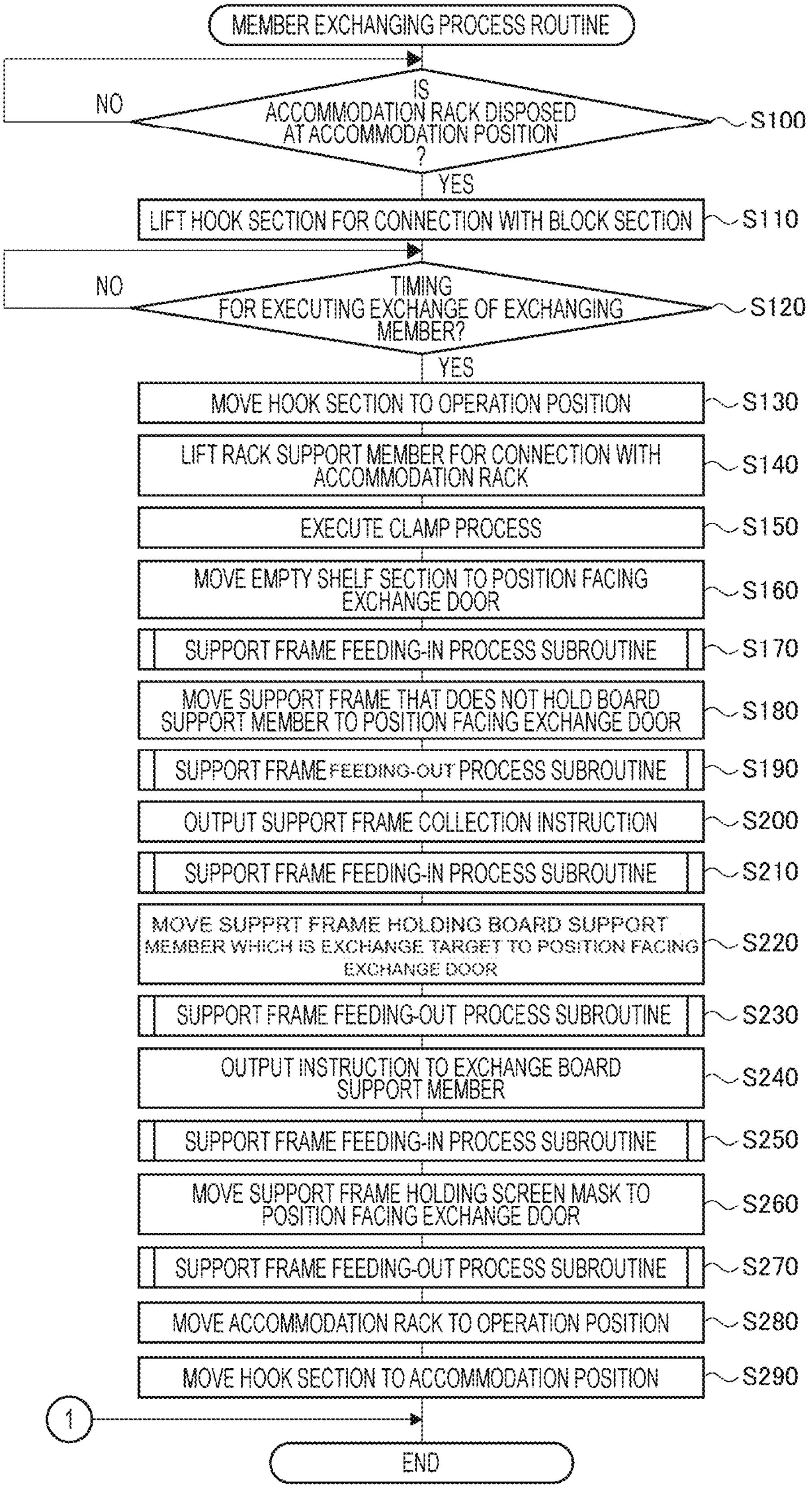
FIG. 18A is a flowchart illustrating an example of a member exchanging process routine.
Figure 18B:
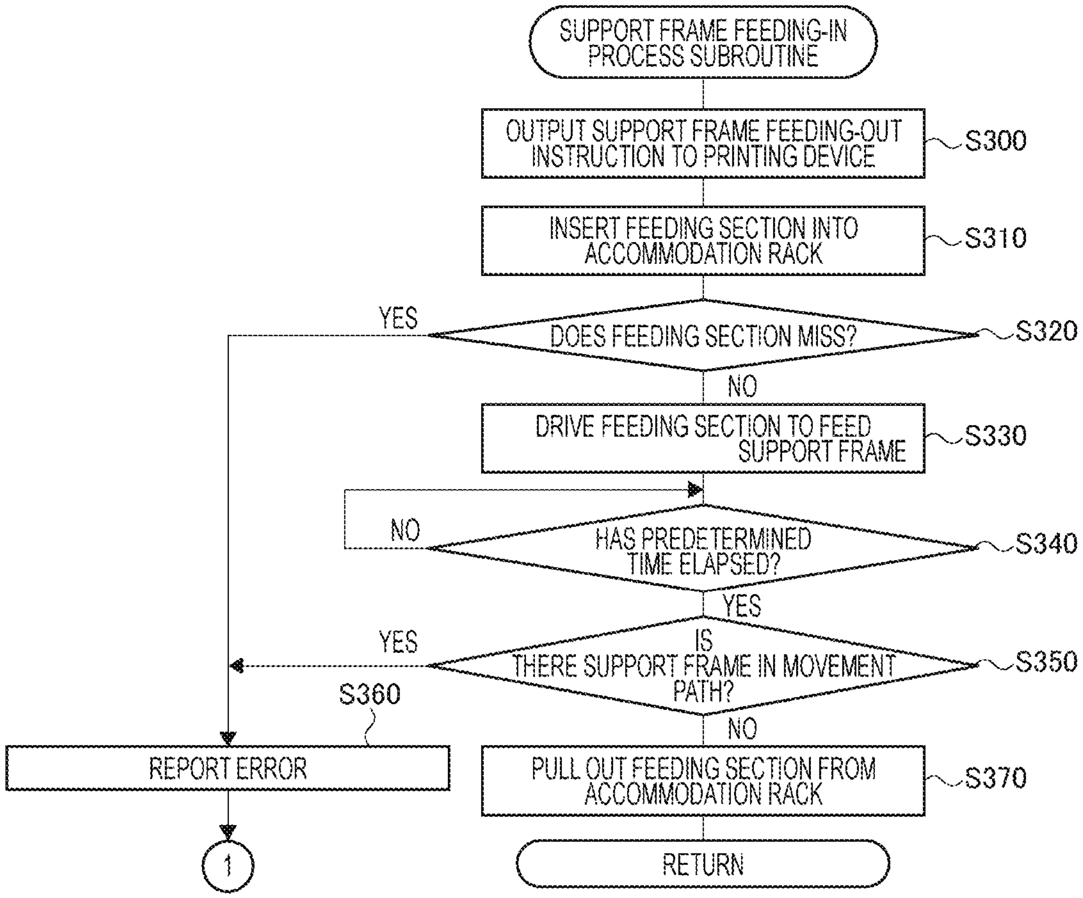
FIG. 18B is a flowchart illustrating an example of a support frame feeding-in process subroutine.
Figure 18C:
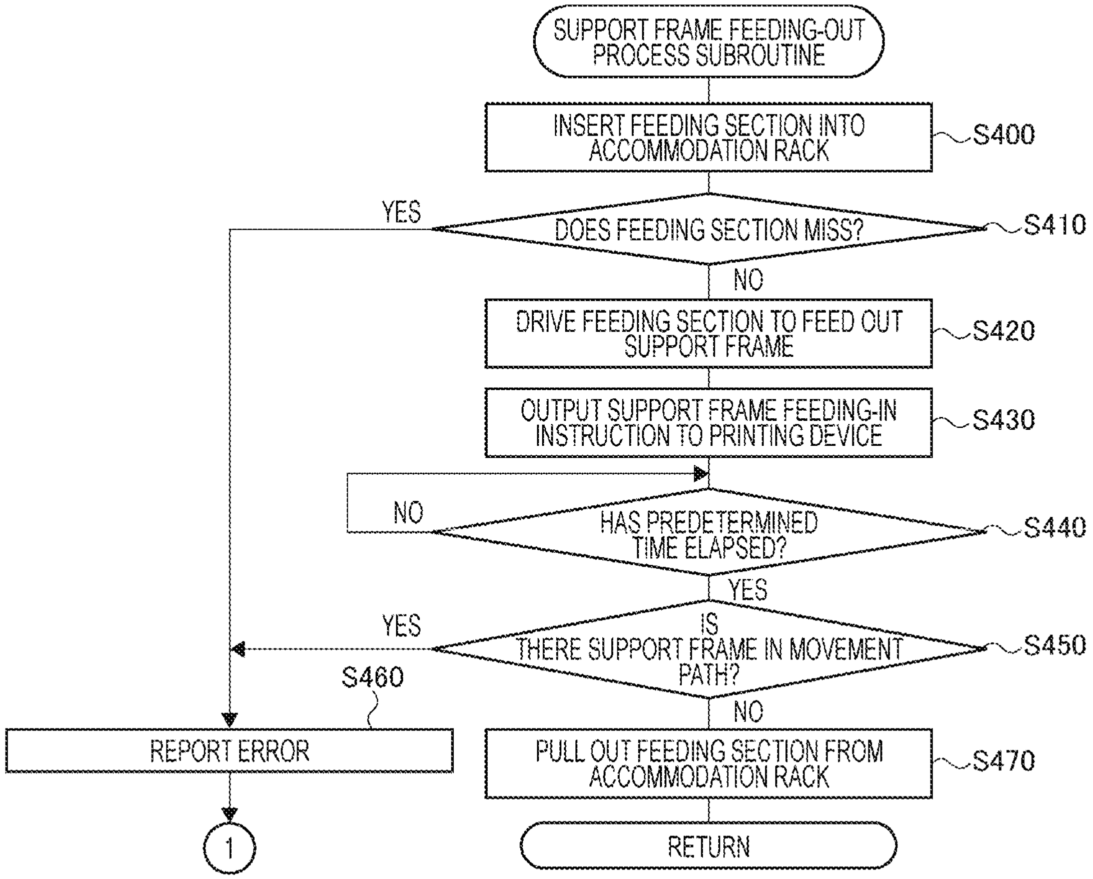
FIG. 18C is a flowchart illustrating an example of a support frame feeding-out process subroutine.
Figure 19A:
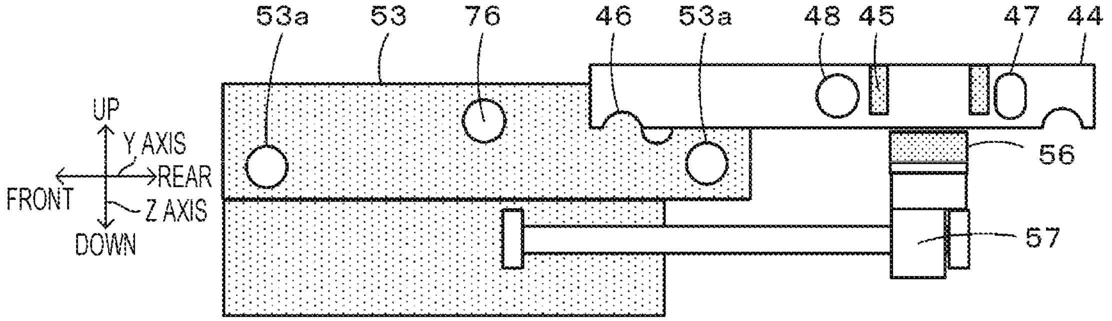
FIG. 19A is a diagram illustrating an operation of front-rear movement device 55 when accommodation rack 40 moves to an exchange position.
Figure 19B:
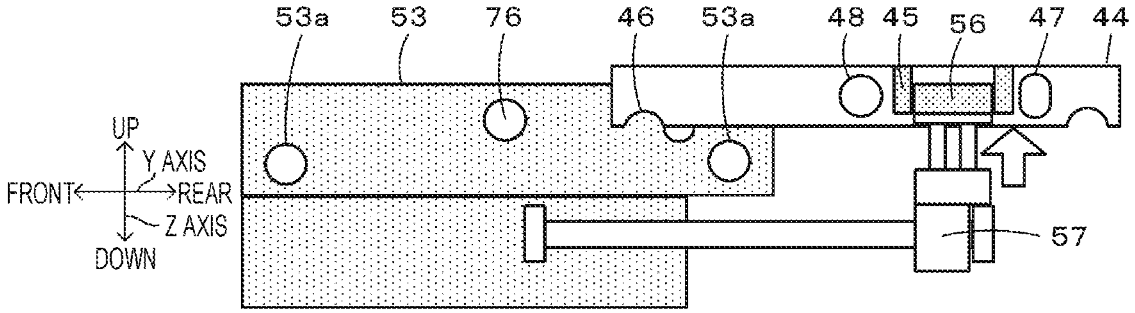
FIG. 19B is a diagram illustrating the operation of front-rear movement device 55 when accommodation rack 40 moves to the exchange position.
Figure 20:
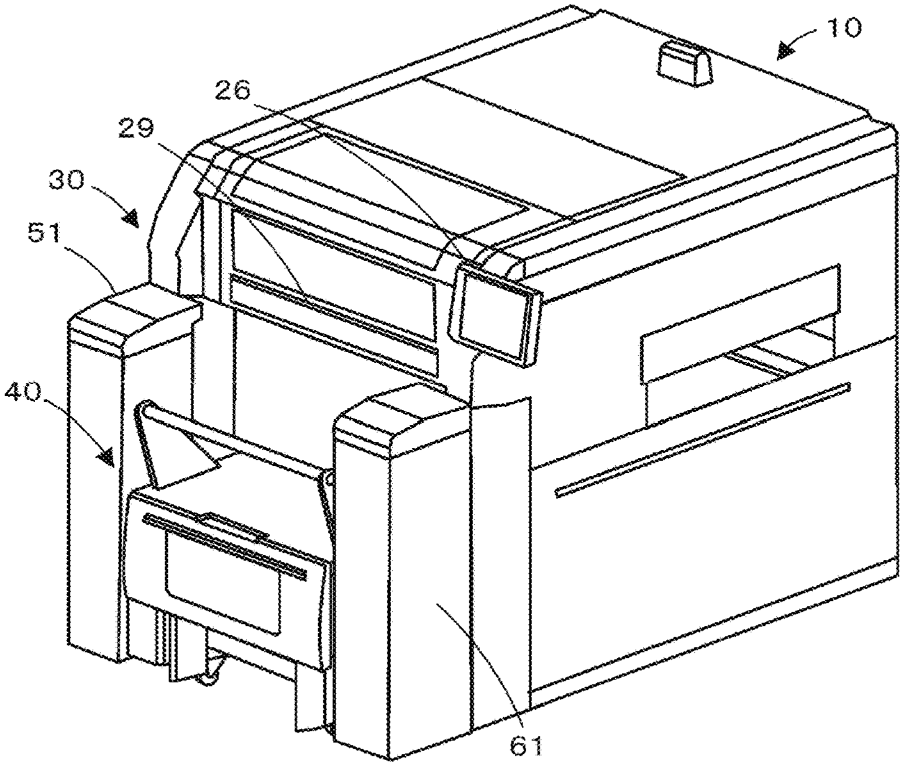
FIG. 20 is a perspective view of printing system 2 when accommodation rack 40 is at an accommodation position.
Figure 21:
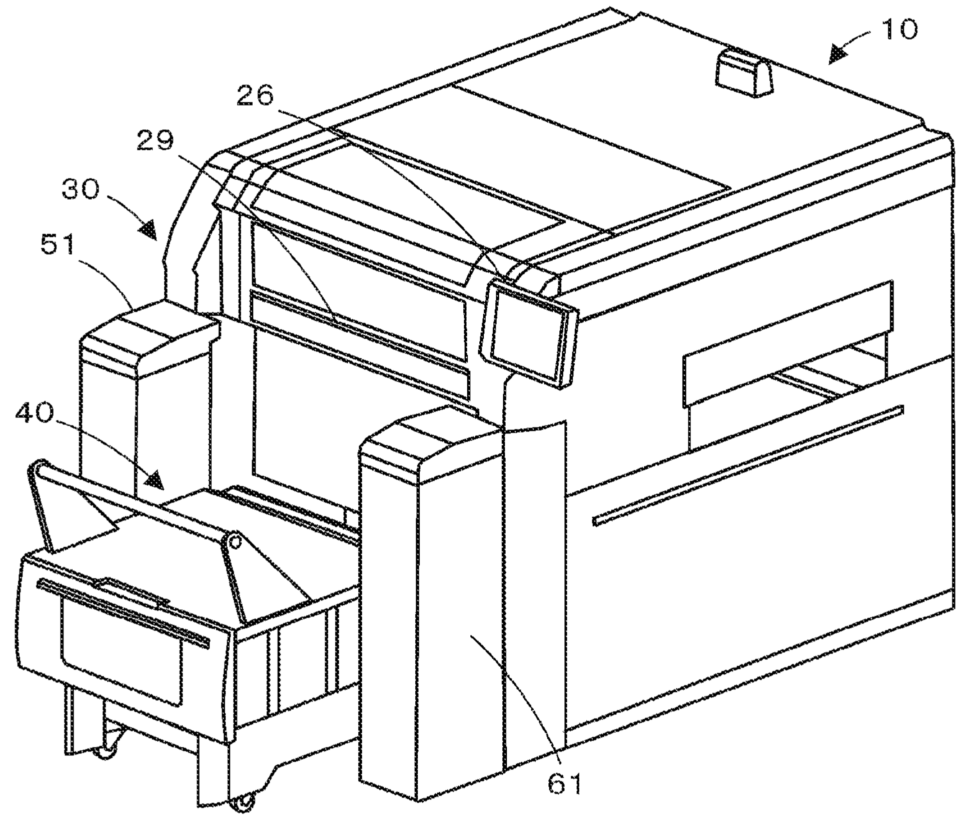
FIG. 21 is a perspective view of printing system 2 when accommodation rack 40 is at an operation position.
Figure 22:
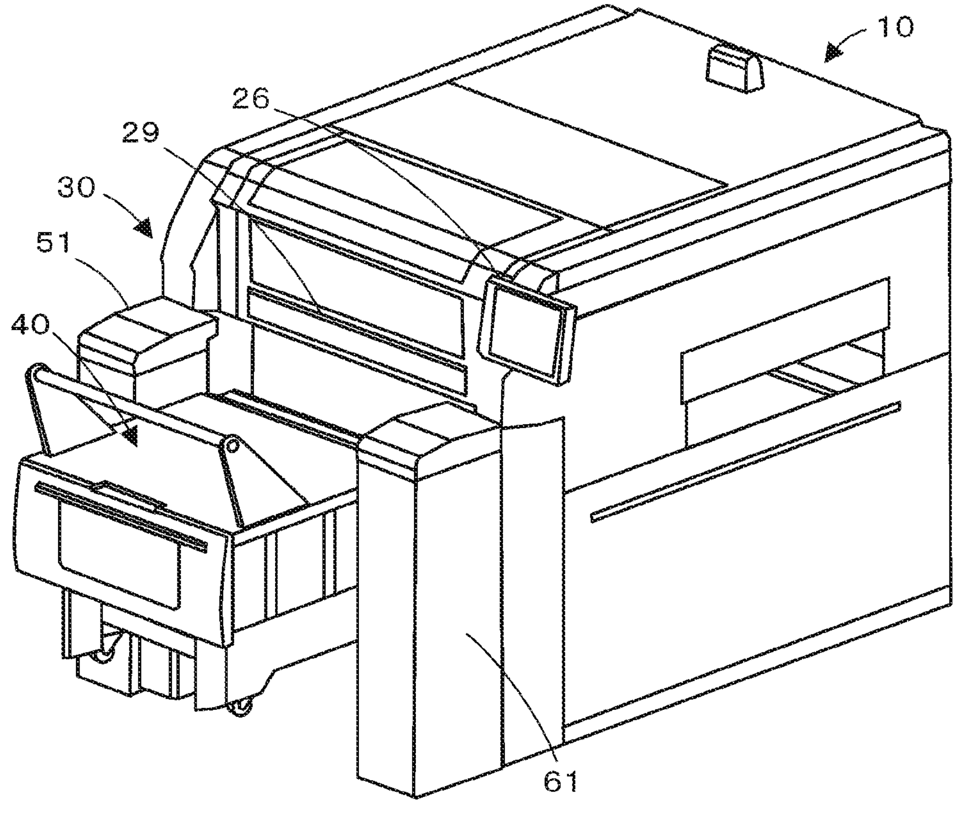
FIG. 22 is a perspective view of printing system 2 in which accommodation rack 40 is lifted.
Figure 23:
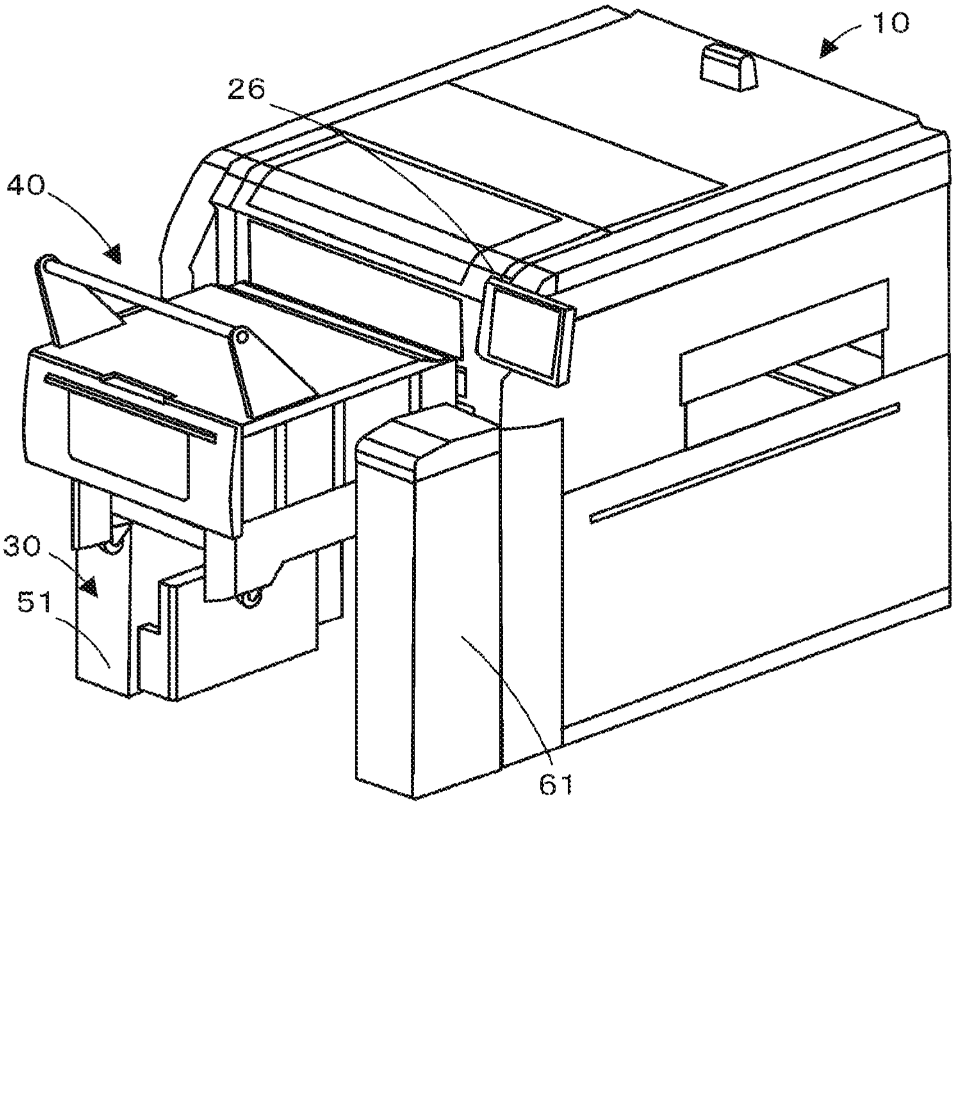
FIG. 23 is a perspective view of printing system 2 when accommodation rack 40 is at the exchange position.

Next, the operation of exchange unit 30 for exchanging support frame 100 will be described with reference to FIGS. 18 to 23. FIG. 18A is a flowchart illustrating an example of a support frame exchanging process routine. FIG. 18B is a flowchart illustrating an example of a support frame feeding-in process subroutine. FIG. 18C is a flowchart illustrating an example of a support frame feeding-out process subroutine. FIGS. 19A to 19D are diagrams illustrating the operation of front-rear movement device 55 when accommodation rack 40 moves to the exchange position. FIG. 20 is a perspective view of printing system 2 when accommodation rack 40 is in the accommodation position. FIG. 21 is a perspective view of printing system 2 when accommodation rack 40 is at the operation position. FIG. 22 is a perspective view of printing system 2 in which accommodation rack 40 is lifted. FIG. 23 is a perspective view of printing system 2 when accommodation rack 40 is at the exchange position.

The exchange of the member is performed by collecting screen mask M, collecting board support member 19, supplying new board support member 19, and supplying new screen mask M. The operation of collection and supply is performed using a common movement path. The member exchanging process routine is stored in a storage section of exchange control section 110 and is executed after exchange unit 30 has been activated. When this routine is executed, CPU of exchange control section 110 determines based on a detection signal from rack detection sensor 25 whether accommodation rack 40 is disposed at the accommodation position (S100). As illustrated in FIG. 20, when accommodation rack 40 is disposed at the accommodation position, the CPU lifts hook section 56 and connects hook section 56 to block section 45 as illustrated in FIGS. 19A and 19B (S110). When hook section 56 is inserted into block section 45, front-rear movement device 55 can move accommodation rack 40 forwards and backwards. Meanwhile, when it is determined in S100 that accommodation rack 40 is not disposed at the accommodation position, the CPU waits until accommodation rack 40 is disposed at the accommodation position.

After S110, the CPU of exchange control section 110 waits until a timing for executing the exchange of screen mask M as the exchangeable member is reached (S120). Examples of the timing for exchanging screen masks M include a timing after the production of boards S of a predetermined type ends, and a timing before the production of boards S of a subsequent type starts.

Figure 19C:
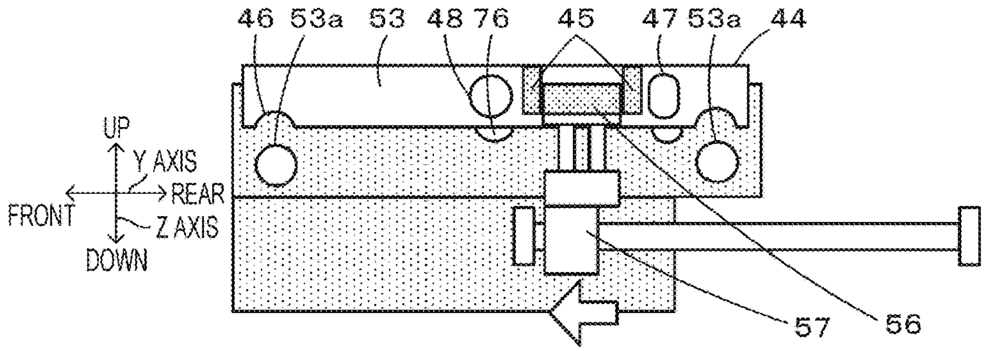
FIG. 19C is a diagram illustrating the operation of front-rear movement device 55 when accommodation rack 40 moves to the exchange position.

Meanwhile, when an affirmative determination is made in S120, the CPU moves hook section 56 to the operation position by front-rear movement device 55 (S130), as illustrated in FIG. 19C. Then, as illustrated in FIG. 21, accommodation rack 40) is pulled out to be lifted.

Figure 19D:
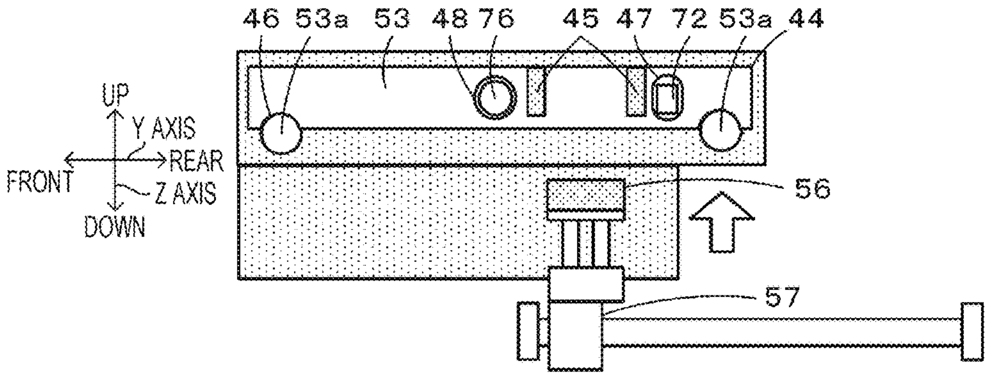
FIG. 19D is a diagram illustrating the operation of front-rear movement device 55 when accommodation rack 40 moves to the exchange position.

Next, as illustrated in FIG. 19D, the CPU lifts rack support member 53 and connects rack support member 53 to the supporting and fixing member 44 of accommodation rack 40 (S140). When rack support member 53 is lifted at the operation position, cam follower 53*a* enters receiving section 46, and accommodation rack 40 is connected to rack support member 53.

Next, the CPU executes a clamp process (S150). Specifically, the CPU drives air cylinder 81 so that insertion pin 76 of stopper section 75 is inserted into insertion hole 48 when air cylinder 74 is driven so that clamp lever 72 is inserted into locking hole 47.

In the present embodiment, holding section 101 arranged at the front side of support frame 100 holds board support member 19 having a larger size (heavier) than holding section 101 arranged at the rear side of support frame 100. Therefore, the center of gravity of accommodation rack 40 tends to be biased toward the front side. However, in the present embodiment, accommodation rack 40 has weight 49 behind the lower surface. Therefore, even after rack support member 53 is lifted and cam follower 53*a* enters receiving section 46, the center of gravity of accommodation rack 40 is closer to printing device 10 side than the front cam follower 53*a*, and accommodation rack 40) is less likely to be inclined forward with respect to rack support member 53. As a result, the position of locking hole 47 to clamp lever 72 is less likely to shift, and the position of insertion hole 48 to insertion pin 76 is less likely to shift. Thus, even in such a case, the clamp process can be executed relatively easily.

Subsequently, as illustrated in FIGS. 22 and 23, the CPU of exchange control section 110 controls lifting and lowering drive section 54 such that empty shelf section 41*a* faces exchange door 29 (S160). Next, the CPU executes the support frame feeding-in process subroutine (refer to S170 and FIG. 18B). When the support frame feeding-in process subroutine is started, the CPU outputs a feeding-out instruction of support frame 100 to printing device 10 (S300). When the feeding-out instruction of support frame 100 is input, printing control section 28 executes a process of moving screen mask M to empty shelf section 41*a* by using exchange section 27.

Subsequently, the CPU of exchange control section 110 controls air cylinder 92 such that feeding section 91 of delivery device 90 enters accommodation rack 40 from opening portion 41*c* (S310). Then, the CPU determines whether feeding section 91 has swung (S320). Specifically, when an OFF signal is input from the automatic switch 120*a* and an ON signal is input from automatic switch 120*b*, the CPU makes an affirmative determination. Meanwhile, when the OFF signal is input from automatic switches 120*a* and 120*b*, the CPU makes a negative determination.

This determination is performed for the following reasons. In a case where there is no support frame 100 in accommodation rack 40, feeding section 91 (surface 93*a* of belt 93) does not abut on support frame 100 but misses. In this case, the piston of air cylinder 92 moves to the forward end, and automatic switch 120*b* outputs the ON signal. In a case where there is support frame 100 in accommodation rack 40, feeding section 91 (surface 93*a* of belt 93) abuts on support frame 100 but does not miss. In this case, the piston of air cylinder 92 is positioned between the backward end and the forward end, and automatic switches 120*a* and 120*b* output the OFF signal.

When an affirmative determination is made in S320, the CPU proceeds to S360. Meanwhile, when a negative determination is made in S320, the CPU controls drive section 94 such that support frame 100 is fed into accommodation rack 40 (S330). Next, the CPU waits until a predetermined time elapses (S340). Here, the predetermined time is determined in advance as a time required for feeding out support frame 100. Then, the CPU determines whether there is support frame 100 in the movement path (S350). The CPU acquires the detection signal of support frame detection sensor 24 from printing control section 28. When the OFF signal is acquired, the CPU makes an affirmative determination. Meanwhile, when the ON signal is acquired, the CPU makes a negative determination. When an affirmative determination is made in S350, the CPU proceeds to S360.

After an affirmative determination is made in S320 or after an affirmative determination is made in S350, the CPU repots the error (S360). Specifically, the CPU outputs an error to management computer 130. When an error is input, management computer 130 displays a message indicating that an error has occurred in a display device (not illustrated). When a negative determination is made in S350, the CPU controls air cylinder 92 such that feeding section 91 is pulled out from accommodation rack 40 through opening portion 41*c* (S370)).

Next, the CPU returns to the member exchanging process routine, and controls lifting and lowering drive section 54 such that shelf section 41*a* that accommodates support frame 100 that does not hold board support member 19 moves to a position facing exchange door 29 (S180). Next, the CPU executes a support frame feeding-out process subroutine (S190, refer to FIG. 18C). When the support frame feeding-out process subroutine is started, the CPU controls air cylinder 92 such that feeding section 91 of delivery device 90 enters accommodation rack 40 from opening portion 41*c* (S400).

Subsequently, the CPU determines whether feeding section 91 has swung (S410). When an affirmative determination is made in S410, the CPU proceeds to S460. Meanwhile, when a negative determination is made in S410, the CPU controls drive section 94 such that support frame 100 is fed out from accommodation rack 40 (S420).

Next, the CPU outputs a support frame feeding-in instruction to printing device 10 (S430). When the support frame feeding-in instruction is input, printing control section 28 performs a process of moving support frame 100 to mask work section 15 using exchange section 27. Next, the CPU of exchange control section 110 waits until a predetermined time elapses (S440). Here, the predetermined time is determined in advance as a time required for feeding out support frame 100. Subsequently, the CPU determines whether the movement path includes support frame 100 (S450). When an affirmative determination is made in S450, the CPU proceeds to S460. After an affirmative determination is made in S410 or after an affirmative determination is made in S450, the CPU reports the error (S460). When a negative determination is made in S450, the CPU controls air cylinder 92 such that feeding section 91 is pulled out from accommodation rack 40 through opening portion 41*c* (S470).

Next, the CPU returns to the member exchanging process routine and outputs a collection instruction of board support member 19 to printing device 10 (S200). When the collection instruction is input, printing control section 28 controls a pusher (not illustrated) to push down claw member 103 of support frame 100. Thus, claw member 103 is opened. In this state, printing control section 28 controls the board lifting and lowering section (not illustrated) to lift board support member 19. Then, in this state, printing control section 28 releases the pressing of claw member 103 by the pusher. Accordingly, claw member 103 is closed, and board support member 19 is held by holding section 101 of support frame 100.

Then, the CPU executes a support frame feeding-in process subroutine (S210). The support frame feeding-in process subroutine has already been described.

Subsequently, the CPU controls lifting and lowering drive section 54 such that shelf section 41*a* accommodating support frame 100 holding board support member 19 which is the exchange target moves to a position facing exchange door 29 (S220). Next, the CPU executes the support frame feeding-out process subroutine (S230)). The support frame feeding-out process subroutine is as described above. Thus, support frame 100 holding board support member 19 which is the exchange target is fed into printing device 10.

Then, the CPU outputs an instruction to exchange board support member 19 to printing device 10 (S240). When the exchange instruction is input, printing control section 28 lifts the board lifting and lowering section (not illustrated). In this state, printing control section 28 controls the pusher (not illustrated) to push down claw member 103. Thus, claw member 103 is opened, and board support member 19 is transferred to the board lifting and lowering section.

Next, the CPU executes the support frame feeding-in process subroutine (S250). Then, the CPU of exchange control section 110 controls lifting and lowering drive section 54 such that shelf section 41*a* that accommodates support frame 100 holding screen mask M moves to a position facing exchange door 29 (S260).

Next, the CPU executes the support frame feeding-out process subroutine (S270)), and controls lifting and lowering drive section 54 such that accommodation rack 40 moves to the operation position (S280).

Subsequently, the CPU releases the clamp by fixing section 70 and moves the hook section to the accommodation position (S290). After S360 of the support frame feeding-in process subroutine, after S460 of the support frame feeding-out process subroutine or after S290 of the member exchanging process routine, the CPU ends this routine.

Here, a correspondence relationship between the elements of the present embodiment and the elements of the present disclosure will be clarified. Printing system 2 of the present embodiment corresponds to a printing system of the present disclosure, printing device 10 corresponds to a printing device, accommodation rack 40 corresponds to an accommodation rack, delivery device 90 corresponds to a delivery device, position sensor 120 and exchange control section 110 correspond to a first detection section, and support frame detection sensor 24 and printing control section 28 correspond to a second detection section.

In printing system 2 described above, it is possible to detect that there is no support frame 100 in shelf section 41*a* based on the detection signal of position sensor 120. Therefore, it is possible to prevent support frame 100 from being fed out to printing device 10 in a state where there is no support frame in shelf section 41*a*, or to prevent support frame 100 from being fed in from printing device 10 in a state where there is the support frame in shelf section 41*a*. As a result, support frame 100 can be more reliably fed in or out between accommodation rack 40 and printing device 10.

Further, printing system 2 includes support frame detection sensor 24 capable of detecting the presence or absence of an object in the movement path between shelf section 41*a* and printing device 10, and includes exchange control section 110 capable of detecting that support frame 100 is caught in the movement path based on the detection signal from support frame detection sensor 24. Therefore, it is possible to prevent a situation in which accommodation rack 40 is lifted and lowered in a state where support frame 100 is caught in the movement path.

Further, in printing system 2, weight 49 is provided in accommodation rack 40 such that the center of gravity of accommodation rack 40 is positioned closer to printing device 10 side than the position supported by rack support member 53. Therefore, when accommodation rack 40 is lifted and lowered together with rack support member 53, accommodation rack 40 is less likely to be inclined to the side opposite to printing device 10. Further, the present disclosure is particularly effective in printing system 2 since holding section 101 on the upstream side in the movement direction of support frame 100 holds board support member 19 having a larger size (heavy) than board support member 19 held by holding section 101 on the downstream side in the movement direction of support frame 100. In this case, compared to a case where board support member 19 having the same size is held in the holding sections 101 on the downstream side and the upstream side, or in a case where board support member 19 is held only on the holding section on the downstream side in the movement direction, the center of gravity of accommodation rack 40 is likely to be biased to the side opposite to printing device 10 with respect to rack support member 53.

The present disclosure is not limited to the embodiment described above at all, and needless to say, the present disclosure can be carried out in various forms as long as the forms belong to the technical scope of the present disclosure.

Figure 24:
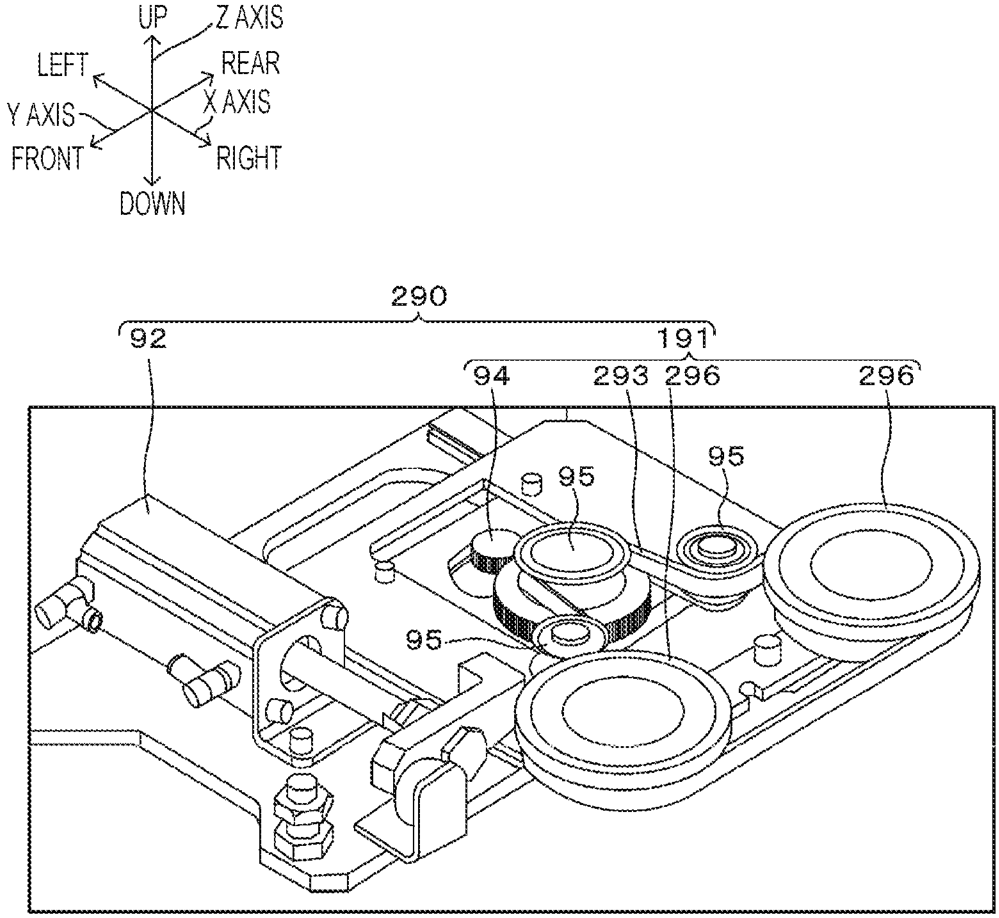
FIG. 24 is a perspective view of delivery device 290.
Figure 25:
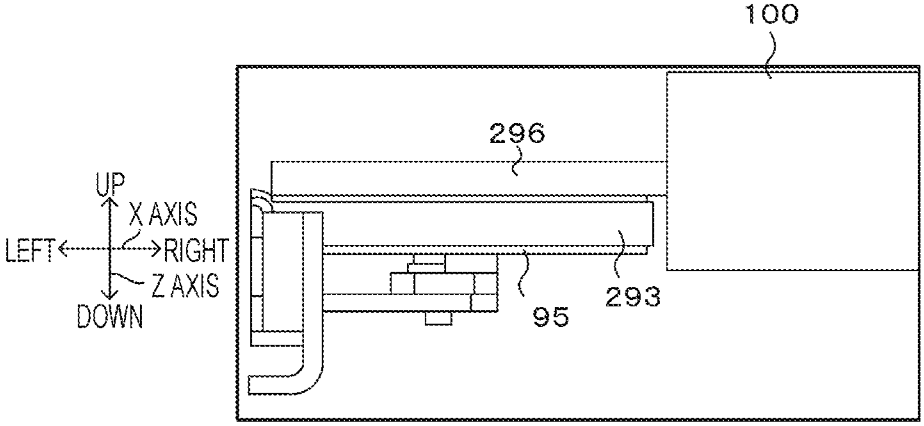
FIG. 25 is a side view of delivery device 290.

In the above-described embodiment, delivery device 90 is used to feed out or in support frame 100 between printing device 10 and accommodation rack 40. However, instead of delivery device 90, delivery device 290 illustrated in FIGS. 24 and 25 may be used. Delivery device 290 includes feeding section 191 and air cylinder 92. Feeding section 191 includes drive section 94, belt 293, and multiple (two in FIG. 24) driving rolls 296. Belt 293 transmits the power of drive section 94 to driving roll 296 via multiple pulleys 95. Belt 293 is made of rubber, for example. Driving roll 296 is capable of feeding out or in support frame 100 in the movement direction (the front-rear direction) by being driven in a state of abutting on support frame 100. Driving roll 296 is formed of a material (for example, urethane) having a lower abrasiveness than belt 293. This makes it difficult for the abrasion powder to enter the inside of the printing device as compared with the case where the support frame is fed out or in by the friction force of the belt. This is because the urethane roll is less likely to wear than the belt.

In the above-described embodiment, exchange unit 30 includes hook section 56 and engages with block section 45 of accommodation rack 40. However, a mechanism other than hook section 56 may be connected to accommodation rack 40. In addition, in the embodiment that has been described heretofore, exchange control section 110 is provided for causing hook section 56 to be lifted and lowered, however, this exchange control section may be omitted.

In the embodiment that has been described heretofore, exchange unit 30 is described as including clamp section 71 and stopper section 75 as fixing section 70, however, the present disclosure is not particularly limited thereto, and hence, either of them may be omitted. In addition, any other fixing section than clamp section 71 and stopper section 75 may be adopted. Alternatively, although exchange unit 30 is described as including fixing section 70, this fixing section 70 may be omitted.

In the above-described embodiment, automatic switches 120*a* and 120*b* are provided. However, only automatic switch 120*b* may be provided.

In the embodiment that has been described heretofore, worker W is described as moving accommodation rack 40, however, the present disclosure is not particularly limited thereto, and hence, for example, accommodation rack 40 may be moved by an automatic conveyance vehicle. The automatic conveyance vehicle may be configured to move accommodation rack 40 by entering the space in the center of caster section 43. Here, handle 42 may be omitted in the case that automatic conveyance vehicle moves accommodation rack 40.

In the embodiment described above, exchange section 27 is described as being made into the rod structure installed in printing head 12 and having the abutting section, however, the present disclosure is not particularly limited thereto, and hence exchange section 27 may be made into an independent mechanism installed in parts other than printing head 12. In addition, in the embodiment described above, exchange section 27 is described as being made into the rod mechanism configured to be brought into engagement with support frame 100, however, exchange section 27 may be made into, for example, a conveyor mechanism on which support frame 100 including an exchangeable member is placed for movement.

In the embodiment described heretofore, accommodation rack 40 is described as having no drive section that moves support frame 100, however, the present disclosure is not particularly limited thereto, and hence, accommodation rack 40 may be configured as one having a drive section that moves support frame 100.

In the above-described embodiment, delivery device 90 is provided only in left unit 51. However, delivery device 90 may be provided only in right unit 61, or may be provided in both of left unit 51 and right unit 61.

In the embodiment described above, the exchangeable member is described as being screen mask M or board support member 19, however, the present disclosure is not limited thereto as long as the exchangeable member is a member needing to be exchanged, and hence the exchangeable member may be one or more of parts, in addition to screen mask M or board support member 19, including cartridge 23 for accommodating the viscous fluid, squeegee 14, cleaning member 20*a* for use in cleaning screen mask M, and the like. In addition, the processing target is described as being board S; however, the present disclosure is not particularly limited thereto, as long as the processing target constitutes an object on which viscous fluid can be printed, and hence, the processing target may be a three-dimensional object or the like. In addition, although the viscous fluid is described as being the solder paste, conductive paste, an adhesive, or the like may be used.

INDUSTRIAL APPLICABILITY

The present disclosure is applicable to a technical field of devices for performing a mounting process of a component.

REFERENCE SIGNS LIST

1: mounting system, 2: printing system, 3: print inspection device, 4: mounting device, 5: mounting inspection device, 10: printing device, 11: printing section, 12: printing head, 13: printing moving section, 14: squeegee, 15: mask work section, 17: board processing section, 18: board conveyance section, 19: board support member, 20: cleaning section, 20*a*: cleaning member, 21: supply section, 23: cartridge, 24: support frame detection sensor, 24*a*: light projecting section, 24*b*: light receiving section, 25: rack detection sensor, 26: operation panel, 27: exchange section, 28: printing control section, 29: exchange door, 30: exchange unit, 40: accommodation rack, 41: rack main body, 41*a*: shelf section, 41*b*: passage section, 41*c*: opening portion, 42: handle, 43: caster section, 44: supporting and fixing member, 45: block section, 46: receiving section, 47: locking hole, 48: insertion hole, 49: weight, 51: left unit, 52: lifting and lowering device, 53: rack support member, 53*a*: cam follower, 54: lifting and lowering drive section, 55: movement device, 56: hook section, 57: drive section, 58: lifting and lowering space, 61: right unit, 70: fixing section, 71: clamp section, 72: clamp lever, 73: lever rotating section, 74: air cylinder, 75: stopper section, 76: insertion pin, 77: pin drive section, 78: spring, 79: cam follower, 80: guide member, 81: air cylinder, 90: delivery device, 91: feeding section, 92: air cylinder, 93: belt, 93*a*: surface, 94: drive section, 95: pulley, 100: support frame, 101: holding section, 103: claw member, 110: exchange control section, 120: position sensor, 120*a*, 120*b*: automatic switch, 130: management computer, 191: feeding section, 290: delivery device, 293: belt, 296: driving roll, L: cross section, M: screen mask, S: board, W: worker

The invention claimed is:

1. A printing system comprising:

a printing device;

an accommodation rack in which multiple shelf sections capable of accommodating a support frame supporting an exchanging member are provided and the support frame is movable between the printing device and the shelf sections in a state where the accommodation rack faces the printing device, and which has an opening in a side surface parallel to a movement direction of the support frame;

a delivery device including a feeding section capable of feeding in or out the support frame in the movement direction in a state of abutting on the support frame in the accommodation rack, and a moving section causing the feeding section to enter and exit from the accommodation rack through the opening; and a first detection section including a first sensor configured to detect an entering state of the feeding section with respect to the accommodation rack, and capable of detecting that there is no support frame in the shelf sections based on a detection signal of the first sensor.

2. The printing system according to claim 1, further comprising:

a second detection section including a second detection sensor capable of detecting presence or absence of an object on a movement path between the shelf section and the printing device, and capable of detecting that the support frame is caught on the movement path based on a detection signal from the second sensor.

* * * * *